United States Patent
Skovby et al.

(10) Patent No.: US 10,226,747 B2
(45) Date of Patent: Mar. 12, 2019

(54) MULTIPLE BATCH SYSTEM FOR THE PREPARATION OF A SOLUTION OF CALCIUM HYDROGEN CARBONATE SUITABLE FOR THE REMINERALIZATION OF DESALINATED WATER AND OF NATURALLY SOFT WATER

(71) Applicant: Omya International AG, Oftringen (CH)

(72) Inventors: Michael Skovby, Meilen (CH); Martine Poffet, Berne (CH)

(73) Assignee: Omya International AG, Oftringen (CH)

( * ) Notice: Subject to any disclaimer, the term of this patent is extended or adjusted under 35 U.S.C. 154(b) by 285 days.

(21) Appl. No.: 14/783,555

(22) PCT Filed: May 6, 2014

(86) PCT No.: PCT/EP2014/059251
§ 371 (c)(1),
(2) Date: Oct. 9, 2015

(87) PCT Pub. No.: WO2014/187666
PCT Pub. Date: Nov. 27, 2014

(65) Prior Publication Data
US 2016/0167000 A1    Jun. 16, 2016

Related U.S. Application Data

(60) Provisional application No. 61/829,304, filed on May 31, 2013.

(30) Foreign Application Priority Data

May 24, 2013 (EP) ..................... 13169161

(51) Int. Cl.
*B01F 15/04* (2006.01)
*A23L 2/52* (2006.01)
(Continued)

(52) U.S. Cl.
CPC ................ *B01F 15/04* (2013.01); *A23L 2/52* (2013.01); *A23L 2/54* (2013.01); *B01F 3/04* (2013.01);
(Continued)

(58) Field of Classification Search
CPC ........................................ B01F 15/04
(Continued)

(56) References Cited

U.S. PATENT DOCUMENTS 1,727,152 A * 9/1929 Winkler ................ B01F 5/162
261/90
3,833,463 A    9/1974 Croom
(Continued)

FOREIGN PATENT DOCUMENTS

CN    103080021 A    5/2013
EP    0520826 A1    12/1992
(Continued)

OTHER PUBLICATIONS

The International Search Report dated Jun. 17, 2004 for PCT Application No. PCT/US2014/059251.
(Continued)

*Primary Examiner* — David L Sorkin
(74) *Attorney, Agent, or Firm* — Amster, Rothstein & Ebenstein LLP

(57) ABSTRACT

The invention relates to a multiple batch system for the preparation of a solution of calcium hydrogen carbonate and the use of such a dual batch system for the preparation of a solution of calcium hydrogen carbonate.

16 Claims, 3 Drawing Sheets

Figure 1:
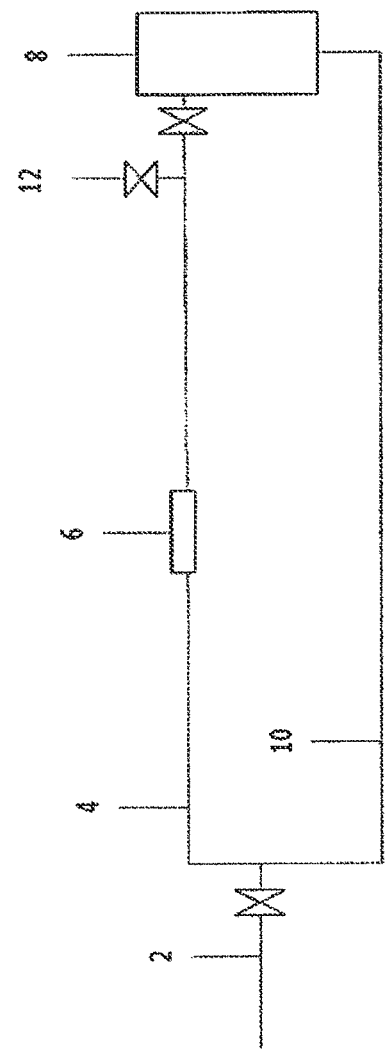

(51) Int. Cl.
*A23L 2/54* (2006.01)
*C02F 1/68* (2006.01)
*B01F 3/04* (2006.01)
*B01F 5/06* (2006.01)
*B01F 7/00* (2006.01)
*C02F 1/44* (2006.01)

(52) U.S. Cl.
CPC .............. *B01F 5/0602* (2013.01); *B01F 7/00* (2013.01); *C02F 1/444* (2013.01); *C02F 1/68* (2013.01); *C02F 1/685* (2013.01); *C02F 1/687* (2013.01)

(58) Field of Classification Search
USPC .................................................. 366/136, 137
See application file for complete search history.

(56) References Cited

U.S. PATENT DOCUMENTS

| | | | |
|---|---|---|---|
| 5,914,046 | A | 6/1999 | Watten |
| 7,374,694 | B2 | 5/2008 | Gaudinot et al. |
| 7,771,599 | B1 | 8/2010 | Choi et al. |
| 8,297,830 | B2 * | 10/2012 | Tseng ...................... B24B 37/04 366/136 |
| 2004/0020410 | A1 | 2/2004 | Gane et al. |
| 2004/0052154 | A1 * | 3/2004 | Hiraoka .................. B24B 37/04 366/136 |
| 2008/0160604 | A1 | 7/2008 | Gupta et al. |
| 2011/0217227 | A1 | 9/2011 | Engsl et al. |
| 2012/0128572 | A1 | 5/2012 | Snare |
| 2014/0014582 | A1 | 1/2014 | Muro et al. |

FOREIGN PATENT DOCUMENTS

| | | |
|---|---|---|
| EP | 1974806 A1 | 10/2008 |
| EP | 1974807 A1 | 10/2008 |
| EP | 1975310 A1 | 10/2008 |
| EP | 1982759 A1 | 10/2008 |
| EP | 2565165 A1 | 3/2013 |
| SU | 1412232 A1 | 9/1990 |
| TW | 201206843 A | 2/2012 |
| TW | 201313621 A | 4/2013 |
| WO | 0039222 A1 | 7/2000 |
| WO | 2009047764 A1 | 4/2009 |
| WO | 2010012691 A1 | 2/2010 |
| WO | 2010023742 A1 | 3/2010 |
| WO | 2012020056 A1 | 2/2012 |
| WO | 2012113957 A1 | 8/2012 |
| WO | 2013014026 A1 | 1/2013 |
| WO | 2013030185 A1 | 3/2013 |

OTHER PUBLICATIONS

The Written Opinion of the International Searching Authority dated Jun. 17, 2004 for PCT Application No. PCT/US2014/059251.
Office Action for Russian Application No. 201592239/28.
Search Report dated Oct. 9, 2013 for European Application No. 1316916.0.
Office Action dated Feb. 12, 2016 for Australian Application No. 2014270613.
Office Action dated Apr. 20, 2017 for Korean Application No. 10-2015-7036567.
Office Action dated Dec. 5, 2016 for Canadian Application No. 2,909,343.
Office Action dated May 3, 2016 for European Application No. 13169161.0.
Office Action dated Nov. 17, 2016 for European Application No. 13169161.0.
Office Action dated May 31, 2017 for European Application No. 13169161.0.
Office Action dated Jun. 5, 2017 for Moroccan Application No. 38633.
Office Action dated Feb. 16, 2017 for Chilean Application No. 201503372.
Office Action dated Aug. 9, 2016 for Chinese Application No. 201480029860.6.
Written Opinion dated Jun. 1, 2016 for Singapore Application No. 11201508734X.
Office action dated Jan. 31, 2018 for Israeli Application No. 242047.
Office action dated Apr. 13, 2018 for Indian Application No. 3240/MUMNP/2015.
Examination Report dated Jan. 3, 2018 for The Cooperation Council for the Arab States of the Gulf Application No. GC 2014-27033.
Office action dated Jul. 2, 2015 for Taiwanese Application No. 103107134.

* cited by examiner

MULTIPLE BATCH SYSTEM FOR THE PREPARATION OF A SOLUTION OF CALCIUM HYDROGEN CARBONATE SUITABLE FOR THE REMINERALIZATION OF DESALINATED WATER AND OF NATURALLY SOFT WATER

CROSS-REFERENCE TO RELATED APPLICATIONS

This is a U.S. national phase of PCT Application No. PCT/EP2014/059251, filed May. 6, 2014, which claims priority to European Application No. 13169161.0, filed May. 24, 2013 and U.S. Provisional Application No. 61/829,304, filed May. 31, 2013.

The invention relates to a multiple batch system for the preparation of a solution of calcium hydrogen carbonate and the use of such a prepared solution of calcium hydrogen carbonate for the remineralization of desalinated or naturally soft water as well as the use of multiple batch system for the continuous preparation of a solution of calcium hydrogen carbonate.

Drinking water has become scarce. Even in countries that are rich in water, not all sources and reservoirs are suitable for the production of drinking water, and many sources of today are threatened by a dramatic deterioration of the water quality. Initially feed water used for drinking purposes was mainly surface water and groundwater. However the treatment of sea water, brine, brackish waters, waste waters and contaminated effluent waters is gaining more and more importance for environmental and economic reasons.

In order to recover water from sea water or brackish water, for potable usages, several processes are known, which are of considerable importance for dry areas, coastal regions and sea islands, and such processes usually comprise distillation, electrolytic as well as osmotic or reverse osmotic processes. The water obtained by such processes is very soft and has a low pH value because of the lack of pH-buffering salts, and thus, tends to be highly reactive and, unless treated, it can create severe corrosion difficulties during its transport in conventional pipelines. Furthermore, untreated desalinated water cannot be used directly as a source of drinking water. To prevent the dissolution of undesirable substances in pipeline systems, to avoid the corrosion of water works such as pipes and valves and to make the water palatable, it is necessary to remineralize the water.

Conventional processes that are mainly used for the remineralization of water are lime dissolution by carbon dioxide and limestone bed filtration, also called calcite contactors. Other, less common remineralization processes, comprise, e.g., the addition of hydrated lime and sodium carbonate, the addition of calcium sulfate and sodium hydrogen carbonate, or the addition of calcium chloride and sodium hydrogen carbonate.

The lime process involves treatment of lime solution with $CO_2$ acidified water, wherein the following reaction is involved:

$$Ca(OH)_2 + 2CO_2 \rightarrow Ca^{2+} + 2HCO_3^-$$

As can be gathered from the above reaction scheme, two equivalents of $CO_2$ are necessary to convert one equivalent of $Ca(OH)_2$ into $Ca^{2+}$ and hydrogen carbonate for remineralization. This method is dependent on the addition of two equivalents of $CO_2$, in order to convert the alkaline hydroxide ions into the buffering species $HCO_3^-$. For the remineralization of water, a saturated calcium hydroxide solution, commonly named lime water, of 0.1-0.2 wt.-%, based on the total weight, is prepared from a lime milk (usually at most 5 wt.-%). Therefore, a saturator to produce the lime water must be used and large volumes of lime water are necessary to achieve the target level of remineralization. A further drawback of this method is that hydrated lime is corrosive and requires appropriate handling and specific equipment. Furthermore, a poorly controlled addition of hydrated lime to the soft water can lead to unwanted pH shifts due to the absence of buffering properties of lime.

The limestone bed filtration process comprises the step of passing the soft water through a bed of granular limestone dissolving the calcium carbonate in the water flow. Contacting limestone with $CO_2$ acidified water mineralizes the water according to:

$$CaCO_3 + CO_2 + H_2O \rightarrow Ca^{2+} + 2HCO_3^-$$

Unlike the lime process, only one equivalent of $CO_2$ is stoichiometrically necessary to convert one equivalent of $CaCO_3$ into $Ca^{2+}$ and hydrogen carbonate for remineralization. Moreover, limestone is not corrosive and due to the buffering properties of $CaCO_3$ major pH shifts are prevented.

One additional advantage of the use of calcium carbonate compared to lime is its very low carbon dioxide footprint. In order to produce one tonne of calcium carbonate 75 kg of $CO_2$ is emitted, whereas 750 kg of $CO_2$ is emitted for the production of one tonne of lime. Therefore, the use of calcium carbonate instead of lime presents some environmental benefits.

The dissolution rate of granular calcium carbonate, however, is slow and induces a sizeable footprint required for these limestone bed filtration systems.

Methods and systems for remineralization of water using lime milk or a slurry of lime are described in U.S. Pat. No. 7,374,694 and EP 0 520 826. U.S. Pat. No. 5,914,046, which describes a method for reducing the acidity in effluent discharges using a pulsed limestone bed.

U.S. Pat. No. 7,771,599 describes a method for the remineralization of process water in a desalination system. The method sequesters carbon dioxide gas from sea water or concentrate (brine) of the desalination process via a gas transfer membrane. The sequestered carbon dioxide gas is thereafter used in the production of soluble calcium hydrogen carbonate $(Ca(HCO_3)_2)$. WO 2012/020056 A1 is directed toward a process for remineralization of water comprising the steps of providing feed water, and injecting gaseous carbon dioxide and a slurry into the feed water, wherein the slurry comprises micronized calcium carbonate. WO 2010/023742 A2 describes a method and apparatus for producing potable water by post-processing (post-treating) desalinated water obtained by desalination of sea water through distillation or reverse osmosis. The method includes a carbon dioxide absorption process of excessively supplying carbon dioxide into the desalinated water to absorb the carbon dioxide, a remineralization process of passing the desalinated water into which carbon dioxide is absorbed through a limestone filter in which limestone is filled to form calcium ions and hydrogen carbonate ions, and a carbon dioxide exhaust process of supplying air into the desalinated water passed through the remineralization process to exhaust the carbon dioxide with the air to obtain the potable water. WO 2012/113957 A1 relates to a method for the remineralisation of fluids, in which final turbidity is controlled. The method includes steps comprising reagent dosing, remineralisation and filtration.

However, the described installations and processes have the disadvantage that the remineralization of water and especially the preparation of a solution of calcium hydrogen carbonate used for the remineralization of water is time dependent and therefore require large contactor tanks or reactors.

In view of the foregoing, improving the remineralization of water still remains of interest to the skilled man. It would be especially desirable to provide an alternative or improved system for the preparation of a concentrated solution of calcium hydrogen carbonate which can be prepared in a more efficient, economic and ecologic way and especially allows the continuous preparation of a solution of calcium hydrogen carbonate (dissolved calcium carbonate in water) which can be used for the remineralization of water, while using a smaller plant footprint.

The foregoing and other objects are solved by the provision of a multiple batch system for the preparation of a solution of calcium hydrogen carbonate, the multiple batch system comprising
   a) at least one dosing unit,
   b) a master batch line comprising in circular communication
      i) at least one gas dosing inlet,
      ii) at least one mixing unit provided with at least one inlet and at least one outlet, and
      iii) at least one tank provided with at least one inlet and at least one outlet,
   c) at least one slave batch line comprising in circular communication
      i) at least one gas dosing inlet,
      ii) at least one mixing unit provided with at least one inlet and at least one outlet, and
      iii) at least one tank provided with at least one inlet and at least one outlet,
wherein the master batch line and the at least one slave batch line are independently connected to the at least one dosing unit.

As used herein, the term "multiple batch" system refers to a system comprising at least two process lines, i.e. one master batch line and one or more slave batch lines, that can be operated independently from each other. However, it is not excluded that the parameters of the master batch line are monitored and/or controlled, while the parameters for the one or more slave batch lines are not monitored and/or controlled.

The term "remineralization" as used in the present invention refers to the restoration of minerals in water containing only minor amounts of minerals or no minerals at all, or in an insufficient amount, in order to obtain a water that is palatable. A remineralization can be achieved by adding at least the specific calcium carbonate as raw material only to the water to be treated. Optionally, e.g., for health-related benefits to ensure the appropriate intake of some essential minerals and trace elements, further substances can be mixed into or with the calcium carbonate and then added to the water during the remineralization process. According to the national guidelines on human health and drinking water quality, the remineralized product can comprise additional minerals containing magnesium, potassium or sodium, e.g., magnesium carbonate, magnesium sulfate, potassium hydrogen carbonate, sodium hydrogen carbonate or other minerals containing essential trace elements.

The term "in circular communication" as used in the present invention means that the units being part of the corresponding master batch line of the inventive multiple batch system are coupled with each other in a loop-like system, and the units being part of the at least one slave batch lines of the inventive multiple batch system are coupled with each other in a loop-like system. Accordingly, a flow of gas or fluid, such as of a suspension, from one unit of the corresponding line of the inventive multiple batch system to another unit of the same line of the inventive multiple batch system is possible, while no flow is observed from the master batch line to the at least one slave batch line and vice versa; such flow can be achieved by way of one or more intermediate (and not specifically mentioned or described) components, apparatuses, devices or other articles like tubes, pipes and pumps.

The inventors of the present invention surprisingly found out that such a multiple batch system enables the skilled person to remineralize water in an efficient, economic and ecologic way. In particular, the inventors of the present invention surprisingly found out that such a multiple batch system enables the skilled person to prepare a solution of calcium hydrogen carbonate in a continuous way which can be further used for the remineralization of water. In particular, this is achieved by providing at least one dosing unit in combination with a master batch line comprising at least one gas dosing inlet, at least one mixing unit and at least one tank and at least one slave batch line comprising at least one gas dosing inlet, at least one mixing unit and at least one tank in which the single units being part of the master batch line and slave batch line, respectively, are connected in circular communication. Furthermore, the master batch line and the at least one slave batch line are independently connected to the at least one dosing unit. Thus, the instant multiple batch system enables an improved preparation of a solution of calcium hydrogen carbonate.

According to another aspect of the present invention, the use of a solution of calcium hydrogen carbonate being prepared in a multiple batch system, as defined herein, for the remineralization of desalinated or naturally soft water is provided. According to a further aspect of the present invention, the use of a multiple batch system, as defined herein, for the remineralization of desalinated or naturally soft water is provided. It is preferred that the desalinated or naturally soft water is selected from distilled water, industrial water, desalinated water, brackish water or brine, treated wastewater or natural water such as ground water, surface water or rainfall.

According to a further aspect of the present invention, the use of a multiple batch system, as defined herein, for the continuous preparation of a solution of calcium hydrogen carbonate is provided. It is preferred that the solution of calcium hydrogen carbonate is prepared in a direct mode, single batch mode or continuous batch mode. It is also preferred that the solution has a concentration of calcium hydrogen carbonate of from 50 to 1,000 mg/l as $CaCO_3$, preferably from 100 to 800 mg/l as $CaCO_3$, and most preferably from 500 to 700 mg/l as $CaCO_3$.

Advantageous embodiments of the present invention are defined in the corresponding sub-claims.

When in the following reference is made to preferred embodiments or technical details of the inventive multiple batch system, it is to be understood that these preferred embodiments or technical details also refer to the inventive use of the solution of calcium hydrogen carbonate and the use of the multiple batch system as defined herein and vice versa (as far as applicable). If, for example, it is set out that the at least one dosing unit of the inventive multiple batch system is connected to a water reservoir and a storage container for solid material also the at least one dosing unit of the inventive uses is connected to a water reservoir and a storage container for solid material.

The present invention will be described with respect to particular embodiments and with reference to certain figures but the invention is not limited thereto but only by the claims. Terms as set forth hereinafter are generally to be understood in their common sense unless indicated otherwise.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to one embodiment of the present invention, the at least one dosing unit is connected to a water reservoir and a storage container for solid material.

According to another embodiment of the present invention, the at least one gas dosing inlet of the master batch line and/or the at least one slave batch line is located before the at least one mixing unit.

According to yet another embodiment of the present invention, the master batch line and/or the at least one slave batch line comprises one mixing unit, preferably at least two mixing units, more preferably at least two mixing units connected in series.

According to one embodiment of the present invention, the at least one mixing unit of the master batch line and/or the at least one slave batch line is a vertical and/or horizontal mixing unit, preferably a vertical mixing unit.

According to another embodiment of the present invention, the at least one mixing unit of the master batch line and/or the at least one slave batch line is at least one static mixer.

According to yet another embodiment of the present invention, the at least one mixing unit of the master batch line and/or the at last one slave batch line is located between the at least one gas dosing inlet and the at least one tank.

According to one embodiment of the present invention, the at least one mixing unit of the master batch line and/or the at least one slave batch line is at least one dynamic mixer. It is preferred that the at least one mixing unit of the master batch line and/or the at least one slave batch line is located between the at least one gas dosing inlet and the at least one tank or integrated in the at least one tank.

According to another embodiment of the present invention, the master batch line comprises at least one control unit monitoring the pH, turbidity, conductivity, temperature and/or calcium ion concentration (e.g. by ion sensitive electrode).

According to yet another embodiment of the present invention, the multiple batch system further comprises at least one membrane filtration unit, preferably a cross flow or dead-end membrane microfiltration device and/or a cross flow or dead-end membrane ultrafiltration device.

The present invention is now described in more detail:

Thus, the present invention provides a multiple batch system for the preparation of a solution of calcium hydrogen carbonate, the multiple batch system comprising
a) at least one dosing unit,
b) a master batch line comprising in circular communication
   i) at least one gas dosing inlet,
   ii) at least one mixing unit provided with at least one inlet and at least one outlet, and
   iii) at least one tank provided with at least one inlet and at least one outlet,
c) at least one slave batch line comprising in circular communication
   i) at least one gas dosing inlet,
   ii) at least one mixing unit provided with at least one inlet and at least one outlet, and
   iii) at least one tank provided with at least one inlet and at least one outlet,
wherein the master batch line and the at least one slave batch line are independently connected to the at least one dosing unit.

The multiple batch system of the present invention is applicable to the preparation of any solution of calcium hydrogen carbonate which is suitable for the remineralization of water.

For example, the solution of calcium hydrogen carbonate that can be prepared in the inventive multiple batch system is suitable for the remineralization of desalinated or naturally soft water.

The water that can be remineralized by using the solution of calcium hydrogen carbonate prepared in the inventive multiple batch system can be derived from various sources and can be selected from amongst distilled water, industrial water, desalinated water such as desalinated sea water, brackish water or brine, treated wastewater or natural water such as ground water, surface water or rainfall. Preferably, the water to be remineralized by using the solution of calcium hydrogen carbonate prepared in the inventive multiple batch system is desalinated water, e.g. permeate or distillate obtained from a desalination process.

The water to be remineralized by using the solution of calcium hydrogen carbonate prepared in the inventive multiple batch system can be pretreated. A pretreatment can be necessary, e.g., in case the water is derived from surface water, groundwater or rainwater. For example, to achieve the drinking water guidelines the water needs to be treated through the use of chemical or physical techniques in order to remove pollutants such as organics and undesirable minerals. For example, ozonation can be used as a first pretreatment step, followed then by coagulation, flocculation, or decantation as a second treatment step. For example, iron (III) salts such as $FeClSO_4$ or $FeCl_3$, or aluminum salts such as $AlCl_3$, $Al_2(SO_4)_3$ or polyaluminium can be used as flocculation agents. The flocculated materials can be removed from the water, e.g, by means of sand filters or multi-layered filters. Further water purification processes that can be used to pretreat the water are described, e.g., in EP 1 975 310, EP 1 982 759, EP 1 974 807, or EP 1 974 806.

If sea water or brackish water is to be remineralized by using the solution of calcium hydrogen carbonate prepared in the inventive multiple batch system, i.e. in the master batch line or each of the at least one slave batch line, the sea water or brackish water is firstly pumped out of the sea by open ocean intakes or subsurface intakes such as wells, and then it undergoes physical pretreatments such as screening, sedimendation or sand removal processes. Depending on the required water quality, additional treatment steps such as coagulation and flocculation can be necessary in order to reduce potential fouling on the membranes. The pretreated sea water or brackish water can then be distilled, e.g., using multiple stage flash, multiple effect distillation, or membrane filtration such as ultrafiltration or reverse osmosis, to remove the remaining particulates and dissolved substances.

The water to be remineralized is at least partially contacted with micronized calcium carbonate such as to obtain an aqueous suspension of calcium carbonate that will be subsequently converted to a solution of calcium hydrogen carbonate by using the inventive multiple batch system, i.e. in the master batch line or each of the at least one slave batch line. The obtained solution of calcium hydrogen carbonate will be further used for the remineralization of the main stream of the water to be remineralized. This is performed by diluting the concentrated solution of calcium hydrogen carbonate prepared in the inventive multiple batch system, i.e. in the master batch line or each of the at least one slave batch line, with the water to be remineralized.

Preferably, the remineralized water obtained by using the solution of calcium hydrogen carbonate prepared in the inventive multiple batch system, i.e. in the master batch line or each of the at least one slave batch line, has a calcium concentration as calcium carbonate from 15 to 200 mg/l, preferably from 30 to 150 mg/l, and most preferably from 100 to 125 mg/l, or from 15 to 100 mg/l, preferably from 20 to 80 mg/l, and most preferably from 40 to 60 mg/l.

For the purpose of the present invention, a "suspension" or "slurry" refers to a system comprising solvent, i.e. an aqueous solvent, and particles of calcium carbonate and/or calcium hydrogen carbonate, wherein at least a part of the particles of the calcium carbonate and/or calcium hydrogen carbonate are present as insoluble solids in the aqueous solvent. Said term does not exclude that a part of the calcium carbonate and/or calcium hydrogen carbonate particles is dissolved in the aqueous solvent. The term "solution" in the meaning of the present invention refers to a system comprising aqueous solvent and particles of calcium carbonate and/or calcium hydrogen carbonate, wherein the particles of the calcium carbonate and/or calcium hydrogen carbonate are dissolved in the aqueous solvent. The term "dissolved" in the meaning of the present invention refers to systems in which no discrete solid particles are observed in the aqueous solvent.

However, the term "aqueous solvent" does not exclude that the aqueous solvent comprises minor amounts of at least one water-miscible solvent.

For example, the at least one water-miscible solvent is preferably selected from methanol, ethanol, acetone, acetonitrile, tetrahydrofuran and mixtures thereof.

In one embodiment of the present invention, the aqueous solvent comprises water in an amount of at least 80 wt.-%, preferably at least 90 wt.-%, more preferably at least 95 wt.-%, even more preferably at least 99 wt.-%, based on the total weight of the aqueous solvent.

According to one embodiment of the present invention, the remineralized water obtained by using the solution of calcium hydrogen carbonate prepared in the inventive multiple batch system, i.e. in the master batch line or each of the at least one slave batch line, can be further treated with a small amount of sodium hydroxide in order to adjust the final pH of the remineralized water.

According to one embodiment of the present invention, the remineralized water obtained by using the solution of calcium hydrogen carbonate prepared in the inventive multiple batch system, i.e. in the master batch line or each of the at least one slave batch line, has a Langelier Saturation Index from −1 to 2, preferably from −0.5 to 0.5, most preferred from −0.2 to 0.2. According to another embodiment of the present invention, the remineralized water obtained by using the solution of calcium hydrogen carbonate prepared in the inventive multiple batch system, i.e. in the master batch line or each of the at least one slave batch line, has a Silt Density Index $SDI_{15}$ below 5, preferably below 4, and most preferred below 3. According to still another embodiment of the present invention, the remineralized water obtained by using the solution of calcium hydrogen carbonate prepared in the inventive multiple batch system, i.e. in the master batch line or each of the at least one slave batch line, has a Membrane Fouling Index $MFI_{0.45}$ below 4, preferably below 2.5, most preferred below 2.

The term "Langelier Saturation Index (LSI)" as used in the present invention describes the tendency of an aqueous liquid to be scale-forming or corrosive, with a positive LSI indicating scale-forming tendencies and a negative LSI indicating a corrosive character. A balanced Langelier Saturation Index, i.e. LSI=0, therefore means that the aqueous liquid is in chemical balance. The LSI is calculated as follows:

$$LSI = pH - pH_s,$$

wherein pH is the actual pH value of the aqueous liquid and $pH_s$ is the pH value of the aqueous liquid at $CaCO_3$ saturation. The $pH_s$ can be estimated as follows:

$$pH_s = (9.3 + A + B) - (C + D),$$

wherein A is the numerical value indicator of total dissolved solids (TDS) present in the aqueous liquid, B is the numerical value indicator of temperature of the aqueous liquid in K, C is the numerical value indicator of the calcium concentration of the aqueous liquid in mg/l of $CaCO_3$, and D is the numerical value indicator of alkalinity of the aqueous liquid in mg/l of $CaCO_3$. The parameters A to D are determined using the following equations:

$$A = (\log_{10}(TDS) - 1)/10,$$

$$B = -13.12 \times \log_{10}(T + 273) + 34.55,$$

$$C = \log_{10}[Ca^{2+}] - 0.4,$$

$$D = \log_{10}(TAC),$$

wherein TDS are the total dissolved solids in mg/l, T is the temperature in °C., $[Ca^{2+}]$ is the calcium concentration of the aqueous liquid in mg/l of $CaCO_3$, and TAC is the alkalinity of the aqueous liquid in mg/l of $CaCO_3$.

The term "Silt Density Index (SDI)" as used in the present invention refers to the quantity of particulate matter in water and correlates with the fouling tendency of reverse osmosis or nanofiltration systems. The SDI can be calculated, e.g., from the rate of plugging of a 0.45 µm membrane filter when water is passed through at a constant applied water pressure of 208.6 kPa. The $SDI_{15}$ value is calculated from the rate of plugging of a 0.45 µm membrane filter when water is passed through at a constant applied water pressure of 208.6 kPa during 15 min. Typically, spiral wound reverse osmosis systems will need an SDI less than 5, and hollow fiber reverse osmosis systems will need an SDI less than 3.

The term "Modified Fouling Index (MFI)" as used in the present invention refers to the concentration of suspended matter and is a more accurate index than the SDI for predicting the tendency of a water to foul reverse osmosis or nanofiltration membranes. The method that can be used for determining the MFI can be the same as for the SDI except that the volume is recorded every 30 seconds over a 15 minute filtration period. The MFI can be obtained graphically as the slope of the straight part of the curve when t/V is plotted against V(t is the time in seconds to collect a volume of V in liters). An MFI value of <1 corresponds to an SDI value of about <3 and can be considered as sufficiently low to control colloidal and particulate fouling.

It is further appreciated that the remineralized water obtained by using the solution of calcium hydrogen carbonate prepared in the inventive multiple batch system, i.e. in the master batch line or each of the at least one slave batch line, has a calcium concentration as calcium carbonate from 15 to 200 mg/l, preferably from 30 to 150 mg/l, and most preferably from 100 to 125 mg/l, or from 15 to 100 mg/l, preferably from 20 to 80 mg/l, and most preferably from 40 to 60 mg/l.

The aqueous suspension of calcium carbonate that is converted to a solution of calcium hydrogen carbonate by using the inventive multiple batch system, i.e. in the master batch line or each of the at least one slave batch line, preferably has an initial concentration of calcium carbonate in the suspension from 50 to 1,000 mg/l, preferably from 100 to 800 mg/l, and most preferably from 500 to 700 mg/l.

The calcium carbonate used for the preparation of the aqueous suspension of calcium carbonate is preferably a micronized calcium carbonate.

For the purpose of the present invention, the term "micronized" refers to a particle size in the micrometer range, e.g., a particle size from 0.1 to 100 µm. The micronized particles can be obtained by techniques based on friction, e.g., milling or grinding either under wet or dry conditions. However, it is also possible to produce the micronized particles by any other suitable method, e.g., by precipitation, rapid expansion of supercritical solutions, spray drying, classification or fractionation of natural occurring sands or muds, filtration of water, sol-gel processes, spray reaction synthesis, flame synthesis or liquid foam synthesis.

For example, the micronized calcium carbonate has a weight median particle size $d_{50}$ from 0.1 to 100 µm, from 0.5 to 50 µm, from 1 to 15 µm, preferably from 2 to 10 µm, most preferably from 3 to 5 µm, or the calcium carbonate has a weight median particle size $d_{50}$ from 1 to 50 µm, from 2 to 20 µm, preferably from 5 to 15 µm and most preferably from 8 to 12 µm.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention, the particle size is specified as weight median particle size $d_{50}$ unless indicated otherwise. For determining the weight median particle size $d_{50}$ value for particles having a $d_{50}$ greater than 0.5 µm, a Sedigraph 5100 device from the company Micromeritics, USA can be used.

Examples of suitable calcium carbonates are ground calcium carbonate, modified calcium carbonate or precipitated calcium carbonate, or a mixture thereof.

"Ground calcium carbonate (GCC)" in the meaning of the present invention is a calcium carbonate obtained from natural sources including marble, chalk or limestone or dolomite. Calcite is a carbonate material and the most stable polymorph of calcium carbonate. The other polymorphs of calcium carbonate are the minerals aragonite and vaterite. Aragonite will change to calcite at 380-470° C., and vaterite is even less stable. Ground calcium carbonate processed through a treatment such as grinding, screening and/or fractionizing by wet and/or dry, for example, by a cyclone. It is known to the skilled person that ground calcium carbonate can inherently contain a defined concentration of magnesium, such as it is the case for dolomitic limestone.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

"Modified calcium carbonate" in the meaning of the present invention is a surface-reacted natural calcium carbonate that is obtained by a process where natural calcium carbonate is reacted with one or more acids having a $pK_a$ at 25° C. of 2.5 or less and with gaseous $CO_2$ formed in situ and/or coming from an external supply, and optionally in the presence of at least one aluminum silicate and/or at least one synthetic silica and/or at least one calcium silicate and/or at least one silicate of a monovalent salt such as sodium silicate and/or potassium silicate and/or lithium silicate, and/or at least one aluminum hydroxide and/or at least one sodium and/or potassium silicate. Further details about the preparation of the surface-reacted natural calcium carbonate are disclosed in WO 00/39222 and US 2004/0020410 A1, the contents of these references herewith being included in the present patent application.

The calcium carbonate is preferably a ground calcium carbonate (GCC). It is further preferred that the calcium carbonate is a ground calcium carbonate having a particle size from 3.0 to 5.0 µm.

Additionally, the calcium carbonate can comprise an HCl insoluble content from 0.02 to 2.5 wt.-%, 0.05 to 1.5 wt.-%, or 0.1 to 0.6 wt.-%, based on the total weight of the calcium carbonate. Preferably, the HCl insoluble content of the calcium carbonate does not exceed 0.6 wt.-%, based on the total weight of the calcium carbonate. The HCl insoluble content can be, e.g., minerals such as quartz, silicate or mica.

In addition to the calcium carbonate, the aqueous suspension of calcium carbonate can comprise further micronized minerals. According to one embodiment, the aqueous suspension of calcium carbonate can comprise micronized magnesium carbonate, calcium magnesium carbonate, e.g. dolomitic limestone, calcareous dolomite or half burnt dolomite, magnesium oxide such as burnt dolomite, magnesium sulfate, potassium hydrogen carbonate, sodium hydrogen carbonate or other minerals containing essential trace elements.

Preferably, the aqueous suspension of calcium carbonate is freshly prepared. The on-site preparation of the aqueous suspension of calcium carbonate can be preferred. The reason is that when the aqueous suspension of calcium carbonate is not prepared on-site and/or freshly the addition of further agents such as stabilizers or biocides to the aqueous suspension of calcium carbonate can be required for stabilizing reasons. However, such agents can be unwanted compounds in the final remineralized water, e.g. for health concerns.

According to one embodiment of the present invention, the time period between the preparation of the aqueous suspension of calcium carbonate and the further dosing of the aqueous suspension of calcium carbonate into the master batch line and/or the at least one slave batch line is short enough to avoid bacterial growth in the aqueous suspension of calcium carbonate.

For example, the time period between the preparation of the aqueous suspension of calcium carbonate and the further dosing of the aqueous suspension of calcium carbonate into the master batch line and/or at least one slave batch line is less than 48 hours, less than 24 hours, less than 12 hours, less than 5 hours, less than 2 hours or less than 1 hour. Preferably, the injected suspension of calcium carbonate meets the microbiological quality requirements specified by the national guidelines for drinking water.

The aqueous suspension of calcium carbonate is preferably prepared in the at least one dosing unit being part of the inventive multiple batch system. Preferably, the multiple batch system of the present invention comprises one dosing unit suitable for dosing of the aqueous suspension of calcium carbonate into the master batch line and/or at least one slave batch line.

The at least one dosing unit of the inventive multiple batch system combines a diversity of functions. In particular, the dosing unit is capable of mixing water with calcium carbonate in an appropriate ratio such as to obtain an aqueous suspension comprising the desired initial content of undissolved calcium carbonate together with a minor amount of already dissolved calcium carbonate, e.g. calcium hydrogen carbonate, in the water phase of the aqueous suspension. Furthermore, the at least one dosing unit of the inventive multiple batch system realizes an optimal mixing of the water with the calcium carbonate such that a homogeneous distribution of particulate particles in the fluid is obtained. The mixing is preferably carried out with an inline-mixer. The inline-mixer can be rotary speed controlled.

According to one preferred embodiment of the present invention, the at least one dosing unit is thus connected to a water reservoir and a storage container for solid material, i.e. calcium carbonate.

It is preferred that the water is fed in the at least one dosing unit by any conventional pumping means known to the skilled person. In one embodiment of the present invention, the water is fed in the at least one dosing unit by any conventional pumping means known to the skilled person allowing an accurate dosing of a liquid, i.e. water. For example, the water is pumped, preferably under control of the water flow, in the at least one dosing unit by metering means such as a flow meter or weighing means known to the skilled person.

Additionally or alternatively, the calcium carbonate is fed from the storage container in the liquid, i.e. water, of the at least one dosing unit by any conventional feeding means known to the skilled person. In one preferred embodiment of the present invention, the calcium carbonate is fed in the water by any conventional feeding means known to the skilled person allowing an accurate dosing of solid material, i.e. calcium carbonate. For example, the calcium carbonate is fed in the water by feeding means such as screw means or weighing means known to the skilled person.

Preferably, the volume of the at least one dosing unit ranges from 1 l to 1,000 kl, preferably from 10 l to 500 kl, more preferably from 10 l to 250 kl and most preferably from 10 l to 100 kl. It is further appreciated that the volume of the at least one dosing unit is proportional to the volume of the at least one tank provided in the master batch line and the at least one tank provided in the at least one slave batch line. That is to say the more slave batch lines in addition to the master batch line are provided in the multiple batch system the bigger the volume of the at least one dosing unit. It is preferred that the volume of the at least one dosing unit corresponds to the volume of the at least one tank provided in the master batch line or the at least one slave batch line. In one embodiment of the present invention, the volume of the at least one dosing unit corresponds at least to the sum of volume of the at least one tank provided in the master batch line and the at least one slave batch line.

In this regard, it is appreciated that the at least one dosing unit can be any kind of dosing unit well known to the man skilled in the art for combining and/or mixing and/or stirring and/or feeding suspensions comprising calcium carbonate.

For example, the at least one dosing unit is a dosing unit available from J. F. Knauer GmbH, Germany as Knauer Dosing station, IKA mixing system MHD 2000 or Sodimate.

One specific requirement of the at least one dosing unit is that it is capable of feeding the master batch line and the at least one slave batch line of the inventive multiple batch system with the aqueous suspension of calcium carbonate. It is thus required that the master batch line is connected to the at least one dosing unit. Furthermore, it is required that the at least one slave batch line is connected to the at least one dosing unit.

In one preferred embodiment of the present invention, the at least one dosing unit is capable of feeding the master batch line and the at least one slave batch line of the inventive multiple batch system simultaneously with the aqueous suspension of calcium carbonate. Alternatively, the at least one dosing unit is capable of feeding the master batch line and the at least one slave batch line of the inventive multiple batch system independently from each other with the aqueous suspension of calcium carbonate.

Preferably, the at last one dosing unit and the master batch line and slave batch line, respectively, are separated by valves such that the units of the master batch line and the at least one slave batch line, respectively, are connected in circular communication, i.e. in a loop-like system. Preferably, the multiple batch system preferably comprises at least one valve located between the at least one dosing unit and the master batch line. It is further appreciated that the multiple batch system preferably comprises at least one valve located between the at least one dosing unit and the at least one slave batch line. If the multiple batch system comprises two or more slave batch lines, the system preferably comprises at least one valve located between the at least one dosing unit and each slave batch line.

In one preferred embodiment of the present invention, the at least one dosing unit and the master batch line and the at least one slave batch line, respectively, are separated by at least one back-pressure valve. Preferably, the at least one back-pressure valve is located between the at least one dosing unit and the master batch line. Additionally or alternatively, the at least one back-pressure valve is located between the at least one dosing unit and the at least one slave batch line. If the multiple batch system comprises two or more slave batch lines, the system preferably comprises at least one back-pressure valve located between the at least one dosing unit and each slave batch line. Preferably, the feeding of the master batch line and/or the at least one slave batch line from the at least one dosing unit is controlled by at least one flowmeter, preferably one flowmeter. In one preferred embodiment of the present invention, the at least one flowmeter is located between the at least one dosing unit and the master batch line and the at least one slave batch line. Preferably, one flowmeter is located between the at least one dosing unit and the master batch line and the at least one slave batch line, such that the feeding of the master batch line and the at least one slave batch line is controlled by the flowmeter.

One specific requirement of the inventive multiple batch system is that the system comprises a master batch line comprising in circular communication at least one gas dosing inlet, e.g. a Bronkhorst device, at least one mixing unit provided with at least one inlet and at least one outlet, and at least one tank provided with at least one inlet and at least one outlet.

In the master batch line, to the aqueous suspension of calcium carbonate injected into the master batch line by the at least one dosing unit carbon dioxide will be dosed. The said suspension of calcium carbonate then reacts with the carbon dioxide and converts in the master batch line to calcium hydrogen carbonate present as an aqueous solution. It is appreciated that the conversion of the suspension of calcium carbonate to the solution of calcium hydrogen carbonate takes place within a specific residence time in the master batch line. For example, the residence time for the conversion of the suspension of calcium carbonate to the solution of calcium hydrogen carbonate in the master batch line is preferably below 240 min, more preferably below 120 min, still more preferably below 90 min, even more preferably below 60 min and most preferably below 45 min. For example, the residence time for the conversion of the suspension of calcium carbonate to the solution of calcium hydrogen carbonate in the master batch line can be from 1 to 240 min, more preferably from 1 to 120 min, still more preferably from 1 to 90 min, even more preferably from 2 to 60 min and most preferably from 2 to 45 min. "Dissolved calcium carbonate" in the meaning of the present invention is understood to encompass calcium carbonate ($CaCO_3$), calcium ions ($Ca^{2+}$), hydrogen carbonate ions ($HCO_3^-$), carbonate ions ($CO_3^{2-}$), carbonic acid ($H_2CO_3$) as well as dissolved $CO_2$, depending on the amount of $CO_2$ dissolved at equilibrium conditions.

Preferably, the solution of calcium hydrogen carbonate obtained in the master batch line has a calcium concentration as calcium hydrogen carbonate from 50 to 1,000 mg/l as $CaCO_3$, preferably from 100 to 800 mg/l as $CaCO_3$, and most preferably from 500 to 700 mg/l as $CaCO_3$. It is thus appreciated that the solution of calcium hydrogen carbonate obtained in the master batch line is a concentrated solution of calcium hydrogen carbonate.

For the purpose of the present invention the term "calcium concentration" refers to the total calcium content in the solution and is specified in mg/l as $Ca^{2+}$ or as $CaCO_3$. The concentration can be measured with a titrator.

Additionally or alternatively, the solution of calcium hydrogen carbonate obtained in the master batch line has a magnesium concentration from 1 to 150 mg/l as $MgCO_3$, preferably from 2 to 100 mg/l as $MgCO_3$, and most preferably from 5 to 50 mg/l as $MgCO_3$.

According to still another embodiment of the present invention, the solution of calcium hydrogen carbonate obtained in the master batch line has a turbidity value of lower than 250 NTU, preferably of lower than 200 NTU, more preferably of lower than 150 NTU and most preferably of lower than 100 NTU. For example, the solution of calcium hydrogen carbonate obtained in the master batch line has a turbidity value of lower than 50 NTU or lower than 20 NTU.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

According to even another embodiment of the present invention, the solution of calcium hydrogen carbonate obtained in the master batch line has a conductivity value of higher than 200 μS/cm, preferably of higher than 500 μS/cm, more preferably of higher than 700 μS/cm or higher than 900 μS/cm.

"Conductivity" in the meaning of the present invention is used as an indicator of how salt-free, ion-free, or impurity-free the measured water is; the purer the water, the lower the conductivity. The conductivity can be measured with a conductivity meter and is specified in μS/cm.

The solution of calcium hydrogen carbonate is preferably prepared by introducing either: (i) a carbon dioxide generating compound or (ii) a carbon dioxide generating compound and an acid.

For the purpose of the present invention, the term "carbon dioxide generating compound" encompasses gaseous carbon dioxide, liquid carbon dioxide, solid carbon dioxide, a gas containing carbon dioxide, i.e. a mixture of at least one gas and carbon dioxide, as well as compounds releasing carbon dioxide upon thermal or chemical treatment. Preferably the carbon dioxide generating compound is a gaseous mixture of carbon dioxide and other gases such as carbon dioxide containing flue gases exhausted from industrial processes like combustion processes or calcination processes or alike, or the carbon dioxide generating compound is gaseous carbon dioxide. When a gaseous mixture of carbon dioxide and other gases is used, then the carbon dioxide is present in the range of 90 to about 99% by volume, and preferably in the range of 95 to 99% by volume, based on the total volume of the gaseous mixture. For example, the carbon dioxide is present in an amount of at least 97% by volume, based on the total volume of the gaseous mixture.

The acid used in the present invention is preferably an acid selected from the group consisting of sulphuric acid, hydrochloric acid, sulphurous acid, phosphoric acid, and is preferably sulphuric acid or phosphoric acid.

The gaseous carbon dioxide can be obtained from a storage tank, in which it is held in the liquid phase. Depending on the consumption rate of carbon dioxide and the environment either cryogenic or conventionally insulated tanks can be used. The conversion of the liquid carbon dioxide into the gaseous carbon dioxide can be done using an air heated vaporizer, or an electrical or steam based vaporizing system. If necessary, the pressure of the gaseous carbon dioxide can be reduced prior to the injection step via the at least one gas dosing inlet, e.g., by using a pressure reducing valve.

The gaseous carbon dioxide can be injected into a stream of the aqueous suspension of calcium carbonate at a controlled rate by at least one gas dosing inlet, forming a dispersion of carbon dioxide bubbles in the stream and allowing the bubbles to dissolve therein. For example, the dissolution of calcium carbonate in the liquid, i.e. water, requires a stoichiometric ratio or an excess of carbon dioxide to the total amount of $CaCO_3$ present in the aqueous suspension of calcium carbonate. If an excess of carbon dioxide is injected, the excess of carbon dioxide varies between 1 and 20 times the stoichiometric ratio regarding $CaCO_3$, preferably between 2 and 10 times the stoichiometric ratio regarding $CaCO_3$, and most preferably between 1 and 6 times the stoichiometric ratio regarding $CaCO_3$, according to the initial $CO_2$ concentration in the aqueous suspension. The dilution ratio of the concentrated calcium hydrogen carbonate solution with the water to be remineralized will have an impact on the final target pH value (excess $CO_2$) and final target calcium concentration (added $CaCO_3$) depending of the actual concentration of the mother solution (calcium hydrogen carbonate solution).

It is appreciated that the dissolution rate of calcium carbonate in the liquid phase, i.e. water, of the suspension of calcium carbonate to obtain the solution of calcium hydrogen carbonate depends on the quantity of $CO_2$ dosed but also on the temperature, pH, pressure, initial $CaCO_3$ concentration in the suspension as well as the dosing rate at which the $CO_2$ is introduced into the suspension of calcium carbonate.

According to an exemplary embodiment, the carbon dioxide is introduced into the aqueous suspension of calcium carbonate used for the preparation of the solution of calcium hydrogen carbonate at a turbulent region of the water by the at least one gas dosing inlet, wherein the turbulence can be created, e.g., by a restriction in the pipeline. For example, the carbon dioxide can be introduced into the throat of a venturi disposed in the pipeline connecting the single units of the master batch line. The narrowing of the cross sectional area of the pipeline at the throat of the venturi creates turbulent flow of sufficient energy to break up the carbon dioxide into relatively small bubbles and thereby facilitates its dissolution. According to one embodiment, the carbon dioxide is introduced under pressure into the stream of the aqueous calcium carbonate suspension in the master batch line.

Additionally or alternatively, it is appreciated that in the master batch line the carbon dioxide is injected in an aqueous suspension of calcium carbonate having a temperature of from 5 to 60° C., preferably of from 10 to 50° C. and most preferably from 10 to 40° C., like from 10 to 30° C. In one embodiment of the present invention, the aqueous suspension of calcium carbonate in the master batch line has a temperature of about room temperature, i.e. from 15 to 25° C.

In one embodiment of the present invention, the carbon dioxide is injected in an aqueous suspension of calcium carbonate in the master batch line at a pressure of 1 to 3 bars at a temperature of about room temperature, i.e. from 15 to 25° C. For example, the carbon dioxide is injected in an aqueous suspension of calcium carbonate in the master batch line at a pressure of about 2 bars at a temperature of about room temperature, i.e. from 15 to 25° C.

Thus, it is appreciated that the at least one gas dosing inlet of the master batch line is preferably a $CO_2$ inlet. In one preferred embodiment of the present invention, the at least one gas dosing inlet of the master batch line is a venturi injector. Alternatively, the at least one gas dosing inlet of the master batch line is a mass flow controller with a back-pressure valve. For example, the mass flow controller is a Bronkhurst device.

In the meaning of the present patent application a venturi injector is a pump-like device that uses the Venturi effect of a converging-diverging nozzle to convert the pressure energy of a motive fluid to velocity energy which creates a low pressure zone that draws in and entrains a fluid by suction. After passing through the throat of the injector, the mixed fluid expands and the velocity is reduced which results in recompressing the mixed fluids by converting velocity energy back into pressure energy. The motive fluid can be a liquid, steam or any other gas. The fluid entrained by suction can be a gas, a liquid, a slurry, or a dust-laden gas stream.

A flow control valve or other means can be used to control the rate of flow of carbon dioxide into the aqueous suspension of calcium carbonate used for the preparation of the concentrated calcium hydrogen carbonate solution. For example, a $CO_2$ dosing block and/or a turbidity, pH or conductivity in-line measuring device and/or a timer can be used to control the rate of $CO_2$ dosed into the suspension of calcium carbonate in the master batch line.

The carbon dioxide acidifies the aqueous suspension of calcium carbonate by forming the aqueous calcium hydrogen carbonate solution. The amount of carbon dioxide that is injected into the aqueous suspension of calcium carbonate will depend on the amount of carbon dioxide that is already present in the aqueous calcium carbonate suspension. The amount of carbon dioxide that is already present in said suspension, in turn, will depend, e.g., on the treatment up-stream to obtain the desalinated water used for preparing the aqueous suspension of calcium carbonate. An aqueous suspension of calcium carbonate, for example, prepared from water that has been desalinated by flash evaporation will contain another amount of carbon dioxide, and thus another pH, than water that has been desalinated by reverse osmosis. Water, for example, that has been desalinated by reverse osmosis can have a pH of about 5.2 to 6.6 and an amount of $CO_2$ of about 0.8 to 15.9 mg/l. However, according to the treatment up-stream to obtain the desalinated water the $CO_2$ concentration can reach up to 45 mg/l or even higher. It is further appreciated that the final remineralized water comprising a high $CO_2$ concentration can undergo decarbonation in order to mitigate the aggressivity of such water phase.

Preferably, the dissolution of carbon dioxide in the aqueous suspension of calcium carbonate used for the preparation of the solution of calcium hydrogen carbonate is facilitated by at least one mixing unit provided with at least one inlet and at least one outlet.

In one preferred embodiment of the present invention, the master batch line comprises one mixing unit, preferably at least two mixing units and more preferably two mixing units. For example, the master batch line comprises at least two mixing units connected in series, preferably two mixing units connected in series.

In this regard, it is appreciated that the at least one mixing unit can be any kind of tank and/or vessel well known to the man skilled in the art for combining and/or mixing and/or stirring suspensions comprising calcium carbonate. For example, the at least one mixing unit is a vertical and/or horizontal mixing unit or a tube-shaped mixing unit. Alternatively, the at least one mixing unit can be any device used for cavitation. For example, the at least one mixing unit is a cavitation device available from Applied Cavitation Technologies, USA.

In one preferred embodiment of the present invention, the at least one mixing unit of the master batch line is a vertical and/or horizontal mixing unit. Preferably, the at least one mixing unit of the master batch line is a vertical mixing unit.

For example, the at least one mixing unit is a tank and/or vessel ranging from 1 l to 1,000 kl, preferably from 10 l to 500 kl, more preferably from 10 l to 250 kl and most preferably from 10 l to 100 kl.

Preferably, the at least one mixing unit of the master batch line comprises stirring means and/or cavitation means. In one embodiment of the present invention, the at least one mixing unit comprises stirring means or cavitation means. Preferably, the at least one mixing unit comprises stirring means. For example, the stirring means are selected from mechanical stirring means such as a stirring blade typically used for agitating and mixing suspensions comprising calcium carbonate in a tank and/or vessel. Alternatively, the stirring means are selected from powder-liquid mixing means typically used for agitating and mixing more concentrated suspensions comprising calcium carbonate in a tank and/or vessel. Alternatively, if the at least one mixing unit is a tube-shaped mixing unit, the mixing unit can comprise mixing beads enabling a sufficient mixing of the calcium carbonate suspension or solution of calcium hydrogen carbonate.

In one embodiment of the present invention, the at least one mixing unit of the master batch line is at least one static mixer. Preferable, the at least one static mixer is characterized in that the mixer comprises a plurality of mixing chambers arranged one behind the other and adjacent to one another along a tube axis.

In this regard, it is appreciated that the at least one static mixer can be any kind of static mixer well known to the man skilled in the art for thoroughly mixing suspensions comprising calcium carbonate or solutions of calcium hydrogen carbonate.

For example, the at least one static mixer is a static mixer available from Sulzer Chemtech AG, Switzerland as Sulzer Mischer SMV™.

Alternatively, the at least one mixing unit of the master batch line is at least one dynamic mixer. Preferably, the dynamic mixer is characterized in that the mixer comprises mixing means such as a stirring blade or mixing beads or a propeller.

In this regard, it is appreciated that at least one dynamic mixer can be any kind of dynamic mixer well known to the man skilled in the art for thoroughly mixing suspensions comprising calcium carbonate or solutions of calcium hydrogen carbonate. In one embodiment of the present invention, the at least one dynamic mixer is a tube-shaped mixer comprising a plurality of mixing beads.

For example, the at least one dynamic mixer can be any kind of dynamic mixer well known to the skilled person for combining and/or mixing and/or stirring suspensions comprising calcium carbonate.

Depending on the concentration of the resulting aqueous solution of calcium hydrogen carbonate, the residence time in the master batch line can be from 1 to 240 min, from 1 to 120 min, from 1 to 90 min, from 2 to 60 min, or from 2 to 45 min. It is appreciated that the residence time in the master batch line can vary in a broad range and can depend, e.g., on the quantity of $CO_2$ dosed in the suspension of calcium carbonate in the master batch line but also on other process parameters such as temperature, pH, pressure and the initial water quality.

For the further dissolution of calcium carbonate out of the aqueous suspension of calcium carbonate in the presence of carbon dioxide to form the solution of dissolved calcium carbonate, i.e. the solution of concentrated calcium hydrogen carbonate, the multiple batch system comprises at least one tank provided with at least one inlet and at least one outlet.

Preferably, the master batch line of the multiple batch system comprises one tank.

In this regard, it is appreciated that the at least one tank can be any kind of tank and/or vessel well known to the man skilled in the art for stirring suspensions comprising calcium carbonate and/or completing the conversion of suspensions comprising calcium carbonate to solutions of calcium hydrogen carbonate.

For example, the at least one tank can be a tank and/or vessel ranging from 1 l to 1,000 kl, preferably from 10 l to 500 kl, more preferably from 10 l to 250 kl and most preferably from 10 l to 100 kl.

It is further appreciated that the at least one tank is an open tank or closed tank well known to the skilled person. In one embodiment of the present invention, the at least one tank is a closed tank. For example, if the at least one tank is provided in the form of a closed tank, the closed tank is preferably operated under pressure, i.e. the stirring of suspensions comprising calcium carbonate and/or the completion of the conversion of suspensions comprising calcium carbonate to solutions of calcium hydrogen carbonate is carried out under pressure. A suitable pressure that can be adjusted within the at least one closed tank preferably ranges from 0.1 bar to 10 bar, more preferably from 0.2 to 5 kPa and most preferably from 0.5 to 2 kPa.

In one embodiment of the present invention, the at least one tank comprises a stirring device. For example, the stirring device is selected from mechanical stirring devices such as a stirring blade typically used for agitating suspensions comprising calcium carbonate or solutions of calcium hydrogen carbonate in a tank and/or vessel.

According to one embodiment of the present invention, the at least one mixing unit of the master batch line is integrated in the at least one tank of the master batch line. For example, if the at least one mixing unit is integrated in the at least one tank of the master batch line, the combined mixing unit/tank is preferably at least one dynamic mixer.

Accordingly, if the at least one mixing unit is integrated in the at least one tank of the master batch line, i.e. a dynamic mixer, the combined mixing unit/tank is located before or after the at least one gas dosing inlet.

Alternatively, if the at least mixing unit is at least one static mixer or at least one dynamic mixer being tube-shaped, the at least one mixing unit and the at least one tank are preferably separated from each other, i.e. are not combined. Accordingly, if the at least one mixing unit is at least one static mixer or at least one dynamic mixer being tube-shaped, the at least one mixing unit is located between the at least one gas dosing inlet and the at least one tank.

In one embodiment of the present invention, the at least one tank of the master batch line comprises at least one control unit regulating the filling level of the at least one tank. In this regard, it is appreciated that the at least one control unit preferably regulates the filling level of the tank in that no calcium carbonate suspension or solution of calcium hydrogen carbonate is overflowing the tank.

For example, the at least one control unit regulates the filling level of the tank in that calcium carbonate suspension or solution of calcium hydrogen carbonate is released into the system if the tank comprises a solution of calcium hydrogen carbonate. It is preferred that the solution of calcium hydrogen carbonate is only released into the system if suitable parameters such as set residence time, temperature, pH, turbidity conductivity, calcium ion concentration etc. are met by the prepared solution of calcium hydrogen carbonate.

Accordingly, the preparation of the solution of calcium hydrogen carbonate is preferably parameter-controlled.

It is thus preferred that the master batch line of the present invention comprises means for controlling, i.e. measuring and monitoring, a parameter value of the aqueous calcium carbonate suspension or solution of calcium hydrogen carbonate such as residence time in the loop-like master batch line, conductivity, temperature, pH, total dissolved solids, turbidity, alkalinity, total hardness, calcium concentration and/or $CO_2$ concentration of the solution of dissolved calcium carbonate.

According to one embodiment of the present invention, the master batch line comprises at least one control unit monitoring the pH, turbidity, conductivity, temperature and/or calcium ion concentration (e.g. by ion sensitive electrode).

Additionally or alternatively, the master batch line comprises at least one control unit regulating the dosing quantity of $CO_2$, dosing rate of $CO_2$, residence time according to the set pH values, turbidity and/or conductivity The master batch line of the inventive multiple batch system comprises the at least one gas dosing inlet, the at least one mixing unit provided with at least one inlet and at least one outlet, and the at least one tank provided with at least one inlet and at least one outlet such that a circular communication is achieved.

It is thus appreciated that the master batch line comprises the required units in that the at least one mixing unit is located between the at least one gas dosing inlet and the at least one tank. For example, the at least one mixing unit is located between the at least one gas dosing inlet and the at least one tank if the at least one mixing unit is a static mixer or a dynamic mixer being tube-shaped. Alternatively or additionally, it is appreciated that the at least one tank is located between the at least one mixing unit and the at least one gas dosing inlet. Alternatively or additionally, it is appreciated that the at least one gas dosing inlet is located between the at least one tank and the at least one mixing unit.

According to one embodiment of the present invention, the at least one mixing unit is integrated in the at least one tank of the master batch line. For example, the at least one mixing unit is integrated in the at least one tank, if the at least one mixing unit is a dynamic mixer. Accordingly, if the at least one mixing unit is integrated in the at least one tank of the master batch line, i.e. a dynamic mixer, the combined mixing unit/tank is located before or after the at least one gas dosing inlet.

It is thus appreciated that the at least one mixing unit of the master batch line being at least one dynamic mixer is located between the at least one gas dosing inlet and the at least one tank or, alternatively, is integrated in the at least one tank.

In other words, the single units of the master batch line are connected directly or indirectly by one or more tubes or pipes provided within, through and/or between the units such that the fluid connecting conduit (or pipeline) is extended out from an outlet of one unit and connected with an inlet of another unit.

According to one embodiment of the present invention, the at least one gas dosing inlet of the master batch line is thus connected to at least one inlet of the at least one mixing unit of the master batch line. Additionally or alternatively, at least one outlet of the at least one mixing unit of the master batch line is connected to at least one inlet of the at least one tank of the master batch line. Additionally or alternatively, at least one outlet of the at least one tank of the master batch line is connected to the at least one gas dosing inlet of the master batch line.

Alternatively, if the at least one mixing unit is integrated in the at least one tank, the at least one gas dosing inlet of the master batch line is connected to at least one inlet of the combined mixing unit/tank of the master batch line. Additionally or alternatively, at least one outlet of the combined mixing unit/tank of the master batch line is connected to at least one inlet of the at least one gas dosing inlet of the master batch line.

For obtaining a concentrated solution of calcium hydrogen carbonate out of an aqueous suspension of calcium carbonate, it is preferred that the at least one gas dosing inlet of the master batch line is located after the at least one dosing unit. In one preferred embodiment of the present invention, the at least one dosing unit is connected to the at least one gas dosing inlet of the master batch line.

The term "after" in the meaning of the present invention refers to the subsequent position behind another unit of the system, e.g. the at least one dosing unit and the at least one gas dosing inlet, the at least one mixing unit or the at least one tank of the master batch line and/or the at least one slave batch line. Said term does not exclude the presence of valves, control units, tubes, pipes, pumps, etc. between said units of the system unless it is indicated otherwise. For example, if it is stated that the at least one gas dosing inlet is located after the at least one dosing unit, the at least one gas dosing inlet is the subsequent unit behind the at least one dosing unit; but the term "after" does not exclude that, e.g., a back-pressure valve is located between the at least one gas dosing inlet and the at least one dosing unit.

The flow of fluid from one unit being part of the master batch line to another unit being part of the same line is preferably achieved by way of one or more intermediate (and not specifically mentioned or described) devices, pumps or apparatuses. Furthermore, such flow can or can not be selectively interruptible such as by valves, switches, control units and/or other suitable components.

In one embodiment of the present invention, the master batch line comprises at least one pump, preferable at least two pumps and most preferably at least three pumps for directing the aqueous calcium carbonate suspension or the solution of calcium hydrogen carbonate from one unit of the master batch line to another unit being part of this line.

For example, the master batch line comprises at least one pump located before the at least one mixing unit of the master batch line. Additionally or alternatively, the at least one pump is located after the at least one tank of the master batch line.

The term "before" in the meaning of the present invention refers to the preceding position ahead of another unit of the system, e.g. the at least one dosing unit and the at least one gas dosing inlet, the at least one mixing unit or the at least one tank of the master batch line and/or the at least one slave batch line. Said term does not exclude the presence of valves, control units, tubes, pipes, pumps etc. between said units of the system unless it is indicated otherwise. For example, if it is stated that a pump is located before the at least one mixing unit, the at least one pump is the preceding unit ahead of the at least one mixing unit.

In one embodiment of the present invention, the master batch line comprises one pump located before the at least one mixing unit and after the at least one tank of the master batch line.

Additionally or alternatively, the at least one pump, preferably one pump, is located before or after the at least one gas dosing inlet, e.g. the venturi injector, of the master batch line.

The at least one pump is preferably designed such that the aqueous calcium carbonate suspension or solution of calcium hydrogen carbonate is directed in a recirculating manner from the at least one gas dosing inlet, to the at least one mixing unit, to the at least one tank and further back to the at least one gas dosing inlet.

The gas dosing inlet, preferably a venturi injector, can be located before (i.e. closer to the at least one mixing unit) or after (i.e. closer to the at least one dosing unit) the at least one pump that is located within the master batch line. One advantage of the use of a venturi injector is that a gas, e.g. $CO_2$ that is produced by the power generation can be introduced in the process that can be carried out with the inventive multiple batch system.

It is further appreciated that the pumping capacity of the at least one pump (in $m^3/h$ of the sum) within the master batch line is 0.01 to 100 times the volume of the at least one tank being part of the master batch line.

Additionally or alternatively, the velocity of the flow induced by the at least one pump of the master batch line feeding the at least one mixing unit is between 0.2 and 10 m/s, preferably between 0.5 and 5 m/s, more preferably between 1 and 2 m/s and most preferably between 1 and 1.5 m/s.

If the master batch line comprises at least one static mixer as the at least one mixing unit, the velocity of the flow induced by the at least one pump of the master batch line feeding the at least one mixing unit is preferably between 1 and 1.5 m/s.

Additionally or alternatively, the at least one pump of the master batch line is operated at a pressure from 1 to 10 bar, preferably from 2 to 8 bar and most preferably from 2 to 6 bar.

The preparation of a solution of calcium hydrogen carbonate can be monitored by detecting parameters such as residence time, conductivity, pH, temperature, calcium ion concentration, pump speed, flow pressure, $CO_2$ dosing or turbidity measured in-line during the batch process in the master batch line. For example, the master batch line comprises at least one control unit monitoring the residence time, pump speed, flow, pressure and/or $CO_2$ dosing. Additionally or alternatively, the master batch line comprises at least one control unit monitoring the pH, turbidity, conductivity, temperature and/or calcium ion concentration (e.g. by ion sensitive electrode) of the calcium carbonate suspension or solution of calcium hydrogen carbonate.

It is thus appreciated that the master batch line preferably comprises at least one control unit regulating the dosing quantity and/or dosing rate of $CO_2$ and/or the residence time according to the set pH values turbidity and/or conductivity. The at least one control unit regulating the dosing quantity and/or dosing rate of $CO_2$ and/or the residence time, and the at least one control unit monitoring the residence time, pump speed, flow, pressure and/or $CO_2$ dosing, and the one control unit monitoring the pH, turbidity, conductivity, temperature and/or calcium ion concentration can be operated collectively or separately.

For example, the master batch line comprises a control unit monitoring the flow which is preferably located before the at least one mixing unit and/or after the at least one gas dosing inlet. Preferably, the master batch line comprises a control unit monitoring the pH, turbidity and conductivity, respectively, which is preferably located after the at least one mixing unit and/or before the at least one tank.

In one embodiment of the present invention, the master batch line comprises a control unit monitoring the flow which is located before the at least one mixing unit and after the at least one gas dosing inlet and a control unit measuring the pH, turbidity and conductivity, respectively, which is located after the at least one mixing unit and before the at least one tank.

Optionally, a part of the aqueous calcium carbonate suspension or solution of calcium hydrogen carbonate can be discharged from the master batch line. Accordingly, the master batch line can be equipped with another outlet for discharging of at least a part of the calcium carbonate suspension or solution of calcium hydrogen carbonate.

The discharged calcium carbonate suspension or solution of calcium hydrogen carbonate can, optionally, be subjected to further treatments such as, for example, a mechanical treatment, or filtration by at least one membrane filtration unit.

In one embodiment of the present invention, the master batch line comprises at least one outlet which is located before and/or after the at least one mixing unit. Preferably, the master batch line comprises at least one outlet which is located before and after the at least one mixing unit. The discharge of calcium carbonate suspension or solution of calcium hydrogen carbonate is preferably controlled by valves, switches, control units and/or other suitable components which are capable of selectively interrupting the flow of the calcium carbonate suspension or solution of calcium hydrogen carbonate.

Another requirement of the inventive multiple batch system is that the system comprises at least one slave batch line comprising in circular communication at least one gas dosing inlet, at least one mixing unit provided with at least one inlet and at least one outlet, and at least one tank provided with at least one inlet and at least one outlet.

Preferably, the multiple batch system comprises at least one slave batch line, preferably at least two slave batch lines and most preferably at least three slave batch lines. For example, the multiple batch system comprises one slave batch line.

In each of the one or more slave batch lines, the aqueous suspension of calcium carbonate injected into each of the at least one slave batch lines by the at least one dosing unit is contacted with carbon dioxide in order to dissolve the calcium carbonate in the aqueous suspension in order to form a solution of calcium hydrogen carbonate. Said suspension of calcium carbonate is converted to a solution of calcium hydrogen carbonate in each of the at least one slave batch lines. It is appreciated that the conversion of the suspension of calcium carbonate to the solution of calcium hydrogen carbonate takes place within a specific residence time in each of the one or more slave batch lines. For example, the residence time for the conversion of the suspension of calcium carbonate to the solution of calcium hydrogen carbonate in each of the one or more slave batch lines is preferably below 240 min, more preferably below 120 min, still more preferably below 90 min, even more preferably below 60 min and most preferably below 45 min. For example, the residence time for the conversion of the suspension of calcium carbonate to the solution of calcium hydrogen carbonate in each of the one or more slave batch lines can be from 1 to 240 min, more preferably from 1 to 120 min, still more preferably from 1 to 90 min, even more preferably from 2 to 60 min and most preferably from 2 to 45 min.

Preferably, the solution of calcium hydrogen carbonate obtained in each of the one or more slave batch lines has a calcium concentration as calcium hydrogen carbonate from 50 to 1,000 mg/l as $CaCO_3$, preferably from 100 to 800 mg/l as $CaCO_3$, and most preferably from 500 to 700 mg/l as $CaCO_3$. It is thus appreciated that the solution of calcium hydrogen carbonate obtained in the at least one slave batch line is a concentrated solution of calcium hydrogen carbonate.

Additionally or alternatively, the solution of calcium hydrogen carbonate obtained in each of the one or more slave batch lines has a magnesium concentration from 1 to 150 mg/l as $MgCO_3$, preferably from 2 to 100 mg/l as $MgCO_3$, and most preferably from 5 to 50 mg/l as $MgCO_3$. According to still another embodiment of the present invention, the solution of calcium hydrogen carbonate obtained in each of the one or more slave batch lines has a turbidity value of lower than 250 NTU, preferably of lower than 200 NTU, more preferably of lower than 150 and most preferably of lower than 100 NTU. For example, the solution of calcium hydrogen carbonate obtained in each of the one or more slave batch lines has a turbidity value of lower than 50 NTU or lower than 20 NTU.

According to even another embodiment of the present invention, the solution of calcium hydrogen carbonate obtained in each of the one or more slave batch lines has a conductivity value of higher than 200 μS/cm, preferably of higher than 500 μS/cm, more preferably of higher than 700 μS/cm or higher than 900 μS/cm.

The solution of calcium hydrogen carbonate is preferably prepared in the at least one slave batch line by introducing either: (i) a carbon dioxide generating compound or (ii) a carbon dioxide generating compound and an acid.

In one embodiment of the present invention, the carbon dioxide generating compound is a gaseous mixture of carbon dioxide and other gases such as carbon dioxide containing flue gases exhausted from industrial processes like combustion processes or calcination processes or alike, or the carbon dioxide generating compound is gaseous carbon dioxide. When a gaseous mixture of carbon dioxide and other gases is used, then the carbon dioxide is present in the range of 90 to about 99% by volume, and preferably in the range of 95 to 99% by volume, based on the total volume of the gaseous mixture. For example, the carbon dioxide is present in an amount of at least 97% by volume, based on the total volume of the gaseous mixture.

The acid used in the present invention is preferably an acid selected from the group consisting of sulphuric acid, hydrochloric acid, sulphurous acid, phosphoric acid, and is preferably sulphuric acid or phosphoric acid.

The gaseous carbon dioxide used in the at least one slave batch line can be obtained from a storage tank, in which it is held in the liquid phase. Depending on the consumption rate of carbon dioxide and the environment either cryogenic or conventionally insulated tanks can be used. The conversion of the liquid carbon dioxide into the gaseous carbon dioxide can be done using an air heated vaporizer, or an electrical or steam based vaporizing system. If necessary, the pressure of the gaseous carbon dioxide can be reduced prior to the injection step via the at least one gas dosing inlet, e.g., by using a pressure reducing valve.

The gaseous carbon dioxide can be injected into a stream of the aqueous suspension of calcium carbonate in the at least one slave batch line at a controlled rate by at least one gas dosing inlet located at the at least one slave batch line, forming a dispersion of carbon dioxide bubbles in the stream and allowing the bubbles to dissolve therein. For example, the dissolution of calcium carbonate in the liquid, i.e. water, requires a stoichiometric ratio or an excess of carbon dioxide to the total amount of $CaCO_3$ present in the aqueous suspension of calcium carbonate. If an excess of carbon dioxide is used, the excess of carbon dioxide varies between 1 and 20 times the stoichiometric ratio regarding $CaCO_3$, preferably between 2 and 10 times the stoichiometric ratio regarding $CaCO_3$ and most preferably between 1 and 6 times the stoichiometric ratio regarding $CaCO_3$, according to the initial $CO_2$, concentration in the aqueous suspension. The dilution ratio of the concentrated calcium hydrogen carbonate solution with the water to be remineralized will impact the final target pH value (excess $CO_2$) and final target calcium concentration (added $CaCO_3$) depending on the actual concentration of the mother solution (calcium hydrogen carbonate solution).

It is appreciated that the dissolution rate of calcium carbonate in the liquid phase, i.e. water, of the suspension of calcium carbonate in the at least one slave batch line to obtain the solution of calcium hydrogen carbonate depends on the quantity of $CO_2$ dosed but also on the temperature, pH, pressure, initial $CaCO_3$ concentration in the suspension as well as the dosing rate at which the $CO_2$ is introduced into the suspension of calcium carbonate in the at least one slave batch line.

According to an exemplary embodiment, the carbon dioxide is introduced into the aqueous suspension of calcium carbonate used for the preparation of the solution of calcium hydrogen carbonate, i.e. in each of the one or more slave batch lines, at a turbulent region of the water by at least one gas dosing inlet located at each of the one or more slave batch lines, wherein the turbulence can be created, e.g. by a restriction in the pipeline. For example, the carbon dioxide can be introduced into the throat of a venturi disposed in the pipeline connecting the single units of the at least one slave batch line. The narrowing of the cross sectional area of the pipeline at the throat of the venturi creates turbulent flow of sufficient energy to break up the carbon dioxide into relatively small bubbles and thereby facilitates its dissolution in the at least one slave batch line. According to one embodiment, the carbon dioxide is introduced under pressure into the stream of the aqueous calcium carbonate suspension in the at least one slave batch line.

Additionally or alternatively, it is appreciated that in the at least one slave batch line the carbon dioxide is injected in an aqueous suspension of calcium carbonate having a temperature of from 5 to 60° C., preferably of from 10 to 50° C. and most preferably from 10 to 40° C., like from 10 to 30° C. In one embodiment of the present invention, the aqueous suspension of calcium carbonate in the at least one slave batch line has a temperature of about room temperature, i.e. from 15 to 25° C.

In one embodiment of the present invention, the carbon dioxide is injected in an aqueous suspension of calcium carbonate in the at least one slave batch line at a pressure of 1 to 3 bars at a temperature of about room temperature, i.e. from 15 to 25° C. For example, the carbon dioxide is injected in an aqueous suspension of calcium carbonate in the at least one slave batch line at a pressure of about 2 bars at a temperature of about room temperature, i.e. from 15 to 25° C.

Thus, it is appreciated that the at least one gas dosing inlet of the at least one slave batch line is preferably a $CO_2$ inlet. In one preferred embodiment of the present invention, the at least one gas dosing inlet of the at least one slave batch line is a venturi injector. Alternatively, the at least one gas dosing inlet of the at least one slave batch line is a mass flow controller with a back-pressure valve. For example, the mass flow controller with a back-pressure valve is a Bronkhurst device.

A flow control valve or other means can be used to control the rate of flow of carbon dioxide into the aqueous suspension of calcium carbonate used for the preparation of the concentrated calcium hydrogen carbonate solution in the at least one slave batch line. For example, a $CO_2$ dosing block and/or a turbidity, pH or conductivity in-line measuring device and/or a timer can be used to control the rate of $CO_2$ dosed into the suspension of calcium carbonate in the at least one slave batch line.

Preferably, in each of the one or more slave batch lines the dissolution of carbon dioxide in the aqueous suspension of calcium carbonate used for the preparation of the solution of calcium hydrogen carbonate is facilitated by at least one mixing unit provided with at least one inlet and at least one outlet.

In one embodiment of the present invention, each of the one or more slave batch lines comprises one mixing unit, preferably at least two mixing units and more preferably two mixing units. For example, each of the one or more slave batch lines comprises at least two mixing units connected in series, preferably two mixing units connected in series.

In this regard, it is appreciated that the at least one mixing unit of the at least one slave batch line can be any kind of tank and/or vessel well known to the man skilled in the art for combining and/or mixing and/or stirring suspensions comprising calcium carbonate. For example, the at least one mixing unit is vertical and/or horizontal mixing unit or a tube-shaped mixing unit. Alternatively, the at least one mixing unit is any device used for cavitation. For example, the at least one mixing unit is a cavitation device available from Applied Cavitation Technologies, USA.

In one embodiment of the present invention, the at least one mixing unit of the at least one slave batch line is a vertical and/or horizontal mixing unit. Preferably, the at least one mixing unit of the at least one slave batch line is a vertical mixing unit.

For example, the at least one mixing unit of the at least one slave batch line is a tank and/or vessel ranging from 1 l to 1,000 kl, preferably from 10 l to 500 kl, more preferably from 10 l to 250 kl and most preferably from 10 l to 100 kl.

Preferably, the at least one mixing unit of the at least one slave batch line comprises stirring means and/or cavitation means. In one embodiment of the present invention, the at least one mixing unit comprises stirring means or cavitation means. Preferably, the at least one mixing unit comprises stirring means. For example, the stirring means are selected from mechanical stirring means such as a stirring blade typically used for agitating and mixing suspensions comprising calcium carbonate in a tank and/or vessel. Alternatively, the stirring means are selected from powder-liquid mixing means typically used for agitating and mixing more concentrated suspensions comprising calcium carbonate in a tank and/or vessel. Alternatively, if the at least one mixing unit is a tube-shaped mixing unit, the mixing unit can comprise mixing beads enabling a sufficient mixing of the calcium carbonate suspension or solution of calcium hydrogen carbonate.

In one embodiment of the present invention, the at least one mixing unit of the at least one slave batch line is at least one static mixer. Preferably, the at least one static mixer is characterized in that the mixer comprises a plurality of mixing chambers arranged one behind the other and adjacent to one another along a tube axis.

In this regard, it is appreciated that the at least one static mixer of the at least one slave batch line can be any kind of static mixer well known to the man skilled in the art for thoroughly mixing suspensions comprising calcium carbonate or solutions of calcium hydrogen carbonate.

For example, the at least one static mixer of the at least one slave batch line is a static mixer available from Sulzer Chemtech AG, Switzerland as Sulzer Mischer SMV™.

Alternatively, the at least one mixing unit of the at least one slave batch line is at least one dynamic mixer. Preferably, the dynamic mixer is characterized in that the mixer comprises mixing means such as a stirring blade or mixing beads or a propeller.

In this regard, it is appreciated that at least one dynamic mixer of the at least one slave batch line can be any kind of dynamic mixer well known to the man skilled in the art for thoroughly mixing suspensions comprising calcium carbonate or solutions of calcium hydrogen carbonate. In one embodiment of the present invention, the at least one dynamic mixer of the at least one slave batch line is a tube-shaped mixer comprising a plurality of mixing beads.

For example, the at least one dynamic mixer of the at least one slave batch line can be any kind of dynamic mixer well known to the skilled person for combining and/or mixing and/or stirring suspensions comprising calcium carbonate.

Depending on the concentration of the resulting aqueous solution of calcium hydrogen carbonate in the at least one slave batch line, the residence time in the at least one slave batch line can be from 1 to 240 min, from 1 to 120 min, from 1 to 90 min, from 2 to 60 min, or from 2 to 45 min. It is appreciated that the residence time in the at least one slave batch line can vary in a broad range and can depend e.g. on the quantity of $CO_2$ dosed in the suspension of calcium carbonate in the at least one slave batch line.

For the further dissolution of calcium carbonate out of the aqueous suspension of calcium carbonate in the presence of carbon dioxide to form the solution of calcium hydrogen carbonate, the at least one slave batch line comprises at least one tank provided with at least one inlet and at least one outlet.

Preferably, the at least one slave batch line of the multiple batch system comprises one tank.

In this regard, it is appreciated that the at least one tank of the at least one slave batch line can be any kind of tank and/or vessel well known to the man skilled in the art for stirring suspensions comprising calcium carbonate and/or completing the conversion of suspensions comprising calcium carbonate to solutions of calcium hydrogen carbonate.

For example, the at least one tank of the at least one slave batch line can be a tank and/or vessel ranging from 1 l to 1,000 kl, preferably from 10 l to 500 kl, more preferably from 10 to 250 kl and most preferably from 10 l to 100 kl.

It is further appreciated that the at least one tank of the at least one slave batch line is an open tank or closed tank well known to the skilled person. In one embodiment of the present invention, the at least one tank of the at least one slave batch line is a closed tank. For example, if the at least one tank of the at least one slave batch line is provided in the form of a closed tank, the closed tank is preferably operated under pressure, i.e. the stirring of the suspension comprising calcium carbonate and/or the completion of the conversion of the suspension comprising calcium carbonate to a solution of calcium hydrogen carbonate is carried out under pressure. A suitable pressure that can be adjusted in the at least one closed tank of the at least one slave batch line ranges from 0.1 to 10 kPa, preferably from 0.2 to 5 kPa and most preferably from 0.5 to 2 kPa.

In one embodiment of the present invention, the at least one tank of the at least one slave batch line comprises a stirring device. For example, the stirring device is selected from mechanical stirring devices such as a stirring blade typically used for agitating suspensions comprising calcium carbonate or solutions of calcium hydrogen carbonate in a tank and/or vessel.

According to one embodiment of the present invention, the at least one mixing unit of the at least one slave batch line is integrated in the at least one tank of the at least one slave batch line. For example, if the at least one mixing unit is integrated in the at least one tank of the at least one slave batch line, the combined mixing unit/tank is preferably at least one dynamic mixer. Accordingly, if the at least one mixing unit is integrated in the at least one tank, i.e. a dynamic mixer, the combined mixing unit/tank is located before or after the at least one gas dosing inlet of the at least one slave batch line.

Alternatively, if the at least mixing unit of the at least one slave batch line is at least one static mixer or at least one dynamic mixer being tube-shaped, the at least one mixing unit and the at least one tank are preferably separated from each other, i.e. are not combined. Accordingly, if the at least one mixing unit of the at least one slave batch line is at least one static mixer or at least one dynamic mixer being tube-shaped, the at least one mixing unit is located between the at least one gas dosing inlet and the at least one tank of the at least one slave batch line.

In one embodiment of the present invention, the at least one tank of the at least one slave batch line comprises at least one control unit regulating the filling level of the at least one tank of the at least one slave batch line. In this regard, it is appreciated that the at least one control unit regulates the filling level of the at least one tank of the at least one slave batch line in that no calcium carbonate suspension or solution of calcium hydrogen carbonate is overflowing the at least one tank.

For example, the at least one control unit of the at least one slave batch line regulates the filling level of the corresponding at least one tank in that calcium carbonate suspension or solution of calcium hydrogen carbonate is released into the system if the tank comprises a solution of calcium hydrogen carbonate.

Each of the one or more slave batch lines of the inventive multiple batch system comprises the at least one gas dosing inlet, the at least one mixing unit provided with at least one inlet and at least one outlet, and the at least one tank provided with at least one inlet and at least one outlet such that a circular communication is achieved.

It is thus appreciated that the at least one slave batch line comprises the required units in that the at least one mixing unit is located between the at least one gas dosing inlet and the at least one tank. For example, the at least one mixing unit of the at least one slave batch line is located between the at least one gas dosing inlet and the at least one tank if the at least one mixing unit is a static mixer or a dynamic mixer being tube-shaped. Alternatively or additionally, it is appreciated that the at least one tank of the at least one slave batch line is located between the at least one mixing unit and the at least one gas dosing inlet. Alternatively or additionally, it is appreciated that the at least one gas dosing inlet of the at least one slave batch line is located between the at least one tank and the at least one mixing unit.

According to one embodiment of the present invention, the at least one mixing unit is integrated in the at least one tank of the at least one slave batch line. For example, the at least one mixing unit is integrated in the at least one tank, if the at least one mixing unit is a dynamic mixer. Accordingly, if the at least one mixing unit is integrated in the at least one tank, i.e. a dynamic mixer, the combined mixing unit/tank is located before or after the at least one gas dosing inlet of the at least one slave batch line.

It is thus appreciated that the at least one mixing unit of the at least one slave batch line being at least one dynamic mixer is located between the at least one gas dosing inlet and the at least one tank or, alternatively, is integrated in the at least one tank of the at least one slave batch line.

In other words, the single units of the at least one slave batch line are connected directly or indirectly by one or more tubes or pipes provided within, through and/or between the units such that the fluid connecting conduit (or pipeline) is extended out from an outlet of one unit and connected with an inlet of another unit.

According to one embodiment of the present invention, the at least one gas dosing inlet of the at least one slave batch line is thus connected to at least one inlet of the at least one mixing unit of the at least one slave batch line. Additionally or alternatively, at least one outlet of the at least one mixing unit of the at least one slave batch line is connected to at least one inlet of the at least one tank of the at least one slave batch line. Additionally or alternatively, at least one outlet of the at least one tank of the at least one slave batch line is connected to the at least one gas dosing inlet of the at least one slave batch line.

Alternatively, if the at least one mixing unit of the at least one slave batch line is integrated in the at least one tank, the at least one gas dosing inlet of the at least one slave batch line is connected to at least one inlet of the combined mixing unit/tank of the at least one slave batch line. Additionally or alternatively, at least one outlet of the combined mixing unit/tank of the master batch line is connected to at least one inlet of the at least one gas dosing inlet of the at least one slave batch line.

For obtaining a concentrated solution of calcium hydrogen carbonate out of an aqueous suspension of calcium carbonate, it is preferred that the at least one gas dosing inlet of the at least one slave batch line is located after the at least one dosing unit. In one preferred embodiment of the present invention, the at least one dosing unit is connected to the at least one gas dosing inlet of the at least one slave batch line.

The flow of fluid from one unit being part of the slave batch line to another unit being part of the same slave batch line can be achieved by way of one or more intermediate (and not specifically mentioned or described) devices, pumps or apparatuses. Furthermore, such flow can or cannot be selectively interruptible such as by valves, switches, control units and/or other suitable components.

In one embodiment of the present invention, the at least one slave batch line comprises at least one pump, preferable at least two pumps and most preferably at least three pumps for directing the aqueous calcium carbonate suspension or the solution of calcium hydrogen carbonate from one unit of the at least one slave batch line to another unit being part of the same slave batch line. For example, the at least one slave batch line comprises at least one pump located before the at least one mixing unit of the at least one slave batch line. Additionally or alternatively, the at least one pump is located after the at least one tank of the at least one slave batch line.

In one embodiment of the present invention, the at least one slave batch line comprises one pump located before the at least one mixing unit and after the at least one tank of the at least one slave batch line.

Additionally or alternatively, the at least one pump, preferably one pump, is located before or after the at least one gas dosing inlet, e.g. the venturi injector, of the at least one slave batch line.

The at least one pump is preferably designed such that the aqueous calcium carbonate suspension or solution of calcium hydrogen carbonate is directed in a recirculating manner from the at least one gas dosing inlet, to the at least one mixing unit, to the at least one tank and further back to the at least one gas dosing inlet of the at least one slave batch line.

The at least one gas dosing inlet, preferably a venturi injector, can be located before (i.e. closer to the at least one mixing unit) or after (i.e. closer to the at least one dosing unit) the at least one pump that is located within the at least one slave batch line.

It is further appreciated that the pumping capacity of the at least one pump (in m$^3$/h of the sum) within the at least one slave batch line is 0.01 to 100 times the volume of the at least one tank being part of the at least one slave batch line.

Additionally or alternatively, the velocity of the flow induced by the at least one pump of the at least one slave batch line feeding the at least one mixing unit is between 0.2 and 10 m/s, preferably between 0.5 and 5 m/s, more preferably between 1 and 2 m/s and most preferably between 1 and 1.5 m/s.

If the at least one slave batch line comprises at least one static mixer as the at least one mixing unit, the velocity of the flow induced by the at least one pump of the at least one slave batch line feeding the at least one mixing unit is preferably between 1 and 1.5 m/s. Additionally or alternatively, the at least one pump of the at least one slave batch line is operated at a pressure from 1 to 10 bar, preferably from 2 to 8 bar and most preferably from 2 to 6 bar.

The preparation of a solution of calcium hydrogen carbonate can be monitored by detecting parameters such as the residence time, pump speed, flow, pressure and/or $CO_2$ dosing.

It is thus appreciated that the at least one slave batch line preferably comprises at least one control unit monitoring the residence time, pump speed, flow, pressure and/or $CO_2$ dosing that can be operated collectively or separately.

Optionally, a part of the aqueous calcium carbonate suspension or solution of calcium hydrogen carbonate can be discharged from the at least one slave batch line. Accordingly, the at least one slave batch line can be equipped with another outlet for discharging of at least a part of the calcium carbonate suspension or solution of calcium hydrogen carbonate.

The discharged calcium carbonate suspension or solution of calcium hydrogen carbonate can, optionally, be subjected to further treatments such as for example a mechanical treatment, or filtration by at least one membrane filtration unit.

In one embodiment of the present invention, the at least one slave batch line comprises at least one outlet which is preferably located after the at least one mixing unit. The discharge of calcium carbonate suspension or solution of calcium hydrogen carbonate from the at least one slave batch line is preferably controlled by valves, switches, control units and/or other suitable components which are capable of selectively interrupting the flow of the calcium carbonate suspension or solution of calcium hydrogen carbonate.

According to another embodiment of the present invention, the aqueous solution of calcium hydrogen carbonate or part of the aqueous suspension of calcium carbonate discharged from the master batch line and/or the at least one slave batch line is filtered, e.g. by a membrane filtration unit, to further reduce the turbidity level of the solution of calcium hydrogen carbonate produced in the multiple batch system, i.e. in the master batch line or each of the at least one slave batch lines.

In one embodiment of the present invention, the multiple batch system thus further comprises at least one membrane filtration unit. For example, the master batch line and each of the at least one slave batch lines are connected to the same membrane filtration unit, i.e. the multiple batch system comprises one membrane filtration unit. Alternatively, each batch line of the multiple batch system, i.e. the master batch line and each of the at least one slave batch lines, comprises at least one membrane filtration unit. That is to say, the master batch line and each of the at least one slave batch lines are connected to a different membrane filtration unit.

The at least one membrane filtration unit being part of the multiple batch system can be any kind of membrane filter known to the skilled person and typically used for filtering aqueous suspensions/solutions comprising calcium carbonate. For example, a cross flow or dead-end membrane microfiltration device and/or a cross flow or dead-end membrane ultrafiltration device can be used.

It is appreciated that there is a pressure difference between the inside of the membrane filtering unit and the surrounding environment so that suspended particles are separated from the suspension/solution and a clear solution is obtained. Preferably, the pressure inside the membrane filtering unit is higher than the pressure of the surrounding environment.

A microfiltration membrane is a membrane having a pore size between 0.1 and 10 μm and is typically used to separate suspended particles from suspension. Microfiltration membranes can be of ceramic, polymer, or other synthetic materials. Preferably, said membranes have backpulse capability, i.e., a reverse flow of the filtrate by pressure through the membrane to the concentrated side of the aqueous suspension removes buildup of contaminants which tend to reduce the flow rate of the membrane. In contrast thereto, an ultrafiltration membrane is a membrane having a pore size between 0.001 and 0.1 μm and is used to separate emulsions, proteins and macromolecules from suspension. The materials of construction are typically the same as for microfiltration membranes. Ultrafiltration membranes are either backpulsed as described above, or backwashed by closing a filtrate valve for a period of time.

For example, the at least one membrane filtration unit is a cross flow membrane filtration device. In one preferred embodiment of the present invention, the at least one membrane filtration unit is a cross flow or dead-end membrane microfiltration device. Additionally or alternatively, the at least one membrane filtration unit is a cross flow or dead-end membrane ultrafiltration device. For example, the at least one membrane filtration unit is a cross flow or dead-end membrane ultrafiltration device, preferably a dead-end membrane ultrafiltration device.

Cross flow membrane filtration devices are known to the skilled man. One cross flow membrane filtration device that is suitable for the inventive multiple batch system includes the cross flow membrane filtration device available from Microdyn-Nadir GMBH, Germany as Mycrodyn Modul CMB 150 or the ultrafiltration membrane 2.5" dizzer module from Inge (UF Module dizzer 2514P 0.5).

It is appreciated that the at least one membrane filtration unit comprises at least one platy filter and/or tube filter and/or capillary filter membrane. Preferably, the at least one membrane filtration unit comprises at least one tube filter membrane. If the at least one membrane filtration unit comprises at least one tube filter membrane, the tube filter membrane preferably has an inner diameter of the tube of 0.01 mm to 25 mm, more preferably of 0.1 mm to 10 mm and most preferably of 0.1 to 7.5 mm. For example, the tube filter membrane has an inner diameter of the tube of 1 mm to 7.5 mm and preferably of 2.5 mm to 7.5 mm.

In one embodiment of the present invention, the at least one membrane filtration unit comprises a capillary filter membrane having a plurality of capillaries. If the at least one membrane filtration unit is a capillary filter membrane having a plurality of capillaries, the capillaries preferably have an inner diameter of 0.01 mm to 25 mm, more preferably of 0.1 mm to 10 mm and most preferably of 0.1 to 7.5 mm. For example, the capillaries of the at least one membrane filtration unit have an inner diameter of 0.5 mm to 5 mm and preferably of 0.5 mm to 2.5 mm.

If the at least one membrane filtration unit is a capillary filter membrane having a plurality of capillaries, the membrane filtration unit preferably comprises from 2 to 15 capillaries, preferably from 4 to 12 and most preferably from 5 to 10 capillaries. For example, the at least one membrane filtration unit comprises 7 capillaries.

Capillary filter membranes are preferred as they provide excellent flow conditions for the separation of solids at relatively low operating pressures and a high recirculation flow rate, as turbulent flow is produced at the membrane surface.

In one embodiment of the present invention, capillary filter membrane comprises at least one membrane having a pore size of between 0.01 µm and 10 µm, preferably between 0.05 and 5 µm, more preferably between 0.1 and 2 µm and most preferably between 0.5 and 2 µm.

Membrane filtration units are known to the skilled man. One membrane filtration unit that can be suitable for the inventive multiple batch system includes the Dizzer® Modules available from Inge watertechnologies, Germany.

It is further appreciated that the speed of flow across the at least one membrane of the cross flow membrane filtration device is between 0.1 m/s and 10 m/s, preferably between 0.5 m/s and 5 m/s and most preferably between 1 m/s and 4 m/s. Additionally or alternatively, the pressure at the inlet of the cross flow membrane filtration device is between 0 bar and 30 bar, preferably between 0.2 bar and 10 bar and most preferably between 0.5 and 5 bar.

In one embodiment of the present invention, the at least one membrane is made of a material selected from the group comprising a sintered material, porous porcelain, synthetic polymers, like polyethylene, polypropylene, Teflon®, or modified polyethersulfone and mixtures thereof.

The solution of calcium hydrogen carbonate obtained after the least one membrane filtration unit has preferably a pH in the range of 6 to 9, preferably in the range of 6.5 to 8, and most preferably in the range of 6.5 to 7.5.

Additionally or alternatively, the solution of calcium hydrogen carbonate obtained after the least one membrane filtration unit has a calcium concentration from 50 to 1,000 mg/l as $CaCO_3$, preferably from 100 to 800 mg/l as $CaCO_3$, and most preferably from 500 to 700 mg/l as $CaCO_3$. According to another embodiment, the solution of calcium hydrogen carbonate obtained after the least one membrane filtration unit has a magnesium concentration from 1 to 150 mg/l as $MgCO_3$, preferably from 2 to 100 mg/l as $MgCO_3$, and most preferably from 5 to 50 mg/l as $MgCO_3$.

According to still another embodiment of the present invention, the solution of calcium hydrogen carbonate obtained after the least one membrane filtration unit has a turbidity value of lower than 5.0 NTU, preferably of lower than 2.0 NTU, and most preferably of lower than 1.0 NTU.

The inventive multiple batch system comprises the at least one membrane filtration unit preferably such that is assembled in a parallel arrangement with regard to the at least one master batch line and/or the at least one slave batch line.

Preferably, the master batch line and the at least one slave batch line can be operated independently from each other. For example, the master batch line is used to prepare a solution of calcium hydrogen carbonate and the at least one slave batch line already contains prepared solution of calcium hydrogen carbonate. Alternatively, the master batch line already contains prepared solution of calcium hydrogen carbonate and the at least one slave batch line is used to prepare a solution of calcium hydrogen carbonate.

The advantage of the inventive multiple batch system is that a continuous preparation of a solution of calcium hydrogen carbonate is achieved which can be further used for the remineralization of water.

Accordingly, the solution of calcium hydrogen carbonate can be prepared in a direct mode, single batch mode or continuous batch mode in the multiple batch system.

For example, the direct mode refers to a system in which the calcium carbonate suspension injected in the master batch line or in one of the at least one slave batch lines is passed through the units of the respective batch line, i.e. the at least one gas dosing inlet, the at least one mixing unit and the at least one tank, only once before being released as end product, i.e. as solution of calcium hydrogen carbonate.

Alternatively, the single batch mode refers to a system in which various calcium carbonate suspensions, i.e. comprising different $CaCO_3$ products or starting solid contents, can be injected in the master batch line and the at least one slave batch lines. In addition thereto, different process conditions can be applied in the master batch line and the at least one slave batch lines, for instance such as different $CO_2$ dosing rates or $CO_2$ stoichiometric ratios in respect to the $CaCO_3$ quantity of the calcium carbonate suspension.

Alternatively, the continuous batch mode refers to a system which can be controlled by either a defined process time per batch line (time controlled) or by one of the monitored parameters of the produced aqueous solution of calcium hydrogen carbonate, such as conductivity, turbidity or pH (value controlled). The afore-mentioned parameters can be monitored for the master batch line only and can be used for controlling all the lines of the multiple batch system. More precisely, one or more of said parameters, i.e. the defined process time and/or one of the set values such as conductivity, turbidity or pH, is measured for the master batch line only, but the parameters are applied on the master batch line as well as the at least one slave batch line. If said parameters are reached, the solution of calcium hydrogen carbonate obtained in the master batch line and the at least one slave batch line is discharged from each line for either final delivery as end product or for further process steps such as temporarily storage in a tank or filtration by means of a membrane filtration unit.

In view of the advantageous preparation of a solution of calcium hydrogen carbonate in the inventive multiple batch system, a further aspect of the present invention refers to the use of the multiple batch system for the continuous preparation of a solution of calcium hydrogen carbonate. It is preferred that the solution of calcium hydrogen carbonate is prepared in a direct mode, single batch mode or continuous batch mode. It is also preferred that the solution has a concentration of calcium hydrogen carbonate of from 50 to 1,000 mg/l as $CaCO_3$, preferably from 100 to 800 mg/l as $CaCO_3$, and most preferably from 500 to 700 mg/l as $CaCO_3$.

It is preferred that the prepared solution of calcium hydrogen carbonate is used for the remineralization of water.

Another aspect of the present invention thus refers to the use of the solution of calcium hydrogen carbonate being prepared in the multiple batch system for the remineralization of desalinated or naturally soft water. A further aspect of the present invention refers to the use of a multiple batch system for the remineralization of desalinated or naturally soft water. It is preferred that the desalinated or naturally soft water is selected from distilled water, industrial water, desalinated water, brackish water or brine, treated wastewater or natural water such as ground water, surface water or rainfall.

The invention is explained in the following in more detail in connection with the Figures with reference to one embodiment of the multiple batch system.

FIG. 1 shows an exemplified arrangement of the master batch line being part of the inventive multiple batch system. The master batch line comprises a slurry supply (2) connecting the at least one dosing unit and the master batch line and is used for injecting the aqueous suspension of calcium carbonate into the master batch line. The master batch line comprises in circular communication a gas dosing inlet (4), at least one mixing unit (6) and at least one tank (8). In order to introduce carbon dioxide into the aqueous suspension of calcium carbonate, the master batch line is equipped with a gas dosing inlet such as a $CO_2$ inlet (4). Furthermore, the dissolution of carbon dioxide in the aqueous suspension of calcium carbonate is facilitated by at least one mixing unit (6) provided in the master batch line. For the further dissolution of calcium carbonate out of the aqueous suspension of calcium carbonate in the presence of carbon dioxide to form the solution of concentrated calcium hydrogen carbonate, the master batch line further comprises at least one tank (8). It is thus preferred that the master batch line is arranged in that the gas dosing inlet (4) is connected to at least one inlet of the at least one mixing unit (6) and at least one outlet of the at least one mixing unit (6) is connected to at least one inlet of the at least one tank (8). Furthermore, at least one outlet of the at least one tank (8) is connected to the gas dosing inlet (4).

Optionally, at least a part of the aqueous solution of calcium hydrogen carbonate can be discharged from the master batch line. Accordingly, the master batch line can be equipped with an outlet (12) for discharging of at least a part of the solution of calcium carbonate. Said outlet (12) is preferably located after the at least one mixing unit (6).

Figure 2:
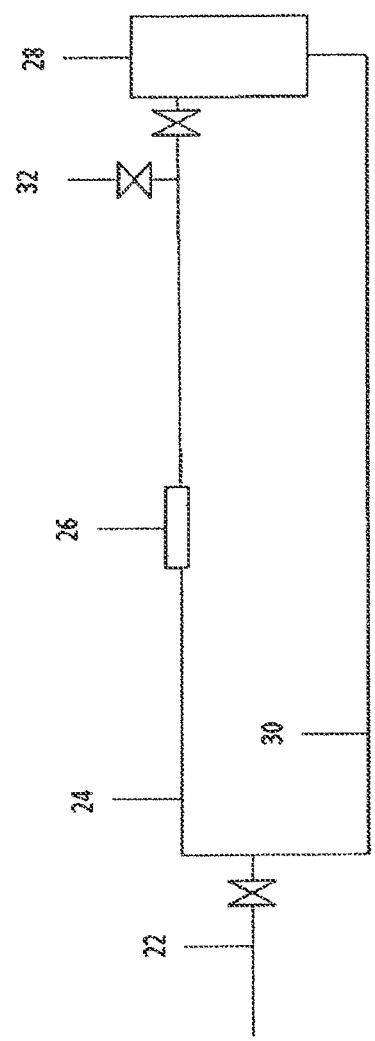

FIG. 2 shows an exemplified arrangement of the at least one slave batch line being part of the inventive multiple batch system. The at least one slave batch line comprises a slurry supply (22) connecting the at least one dosing unit and the at least one slave batch line and is used for injecting the aqueous suspension of calcium carbonate into the at least one slave batch line. The at least one slave batch line comprises in circular communication a gas dosing inlet (24), at least one mixing unit (26) and at least one tank (28). In order to introduce carbon dioxide into the aqueous suspension of calcium carbonate, the at least one slave batch line is equipped with a gas dosing inlet such as a $CO_2$ inlet (24). Furthermore, the dissolution of carbon dioxide in the aqueous suspension of calcium carbonate is facilitated by at least one mixing unit (26) provided in the at least one slave batch line. For the further dissolution of calcium carbonate out of the aqueous suspension of calcium carbonate in the presence of carbon dioxide to form the solution of concentrated calcium hydrogen carbonate, the at least one slave batch line further comprises at least one tank (28). It is thus preferred that the at least one slave batch line is arranged in that the gas dosing inlet (24) is connected to at least one inlet of the at least one mixing unit (26) and at least one outlet of the at least one mixing unit (26) is connected to at least one inlet of the at least one tank (28). Furthermore, at least one outlet of the at least one tank (28) is connected to the gas dosing inlet (24).

Optionally, at least a part of the aqueous solution of calcium hydrogen carbonate can be discharged from the at least one slave batch line. Accordingly, the at least one slave batch line can be equipped with an outlet (32) for discharging of at least a part of the solution of calcium carbonate. Said outlet (32) is preferably located after the at least one mixing unit (26).

Figure 3:
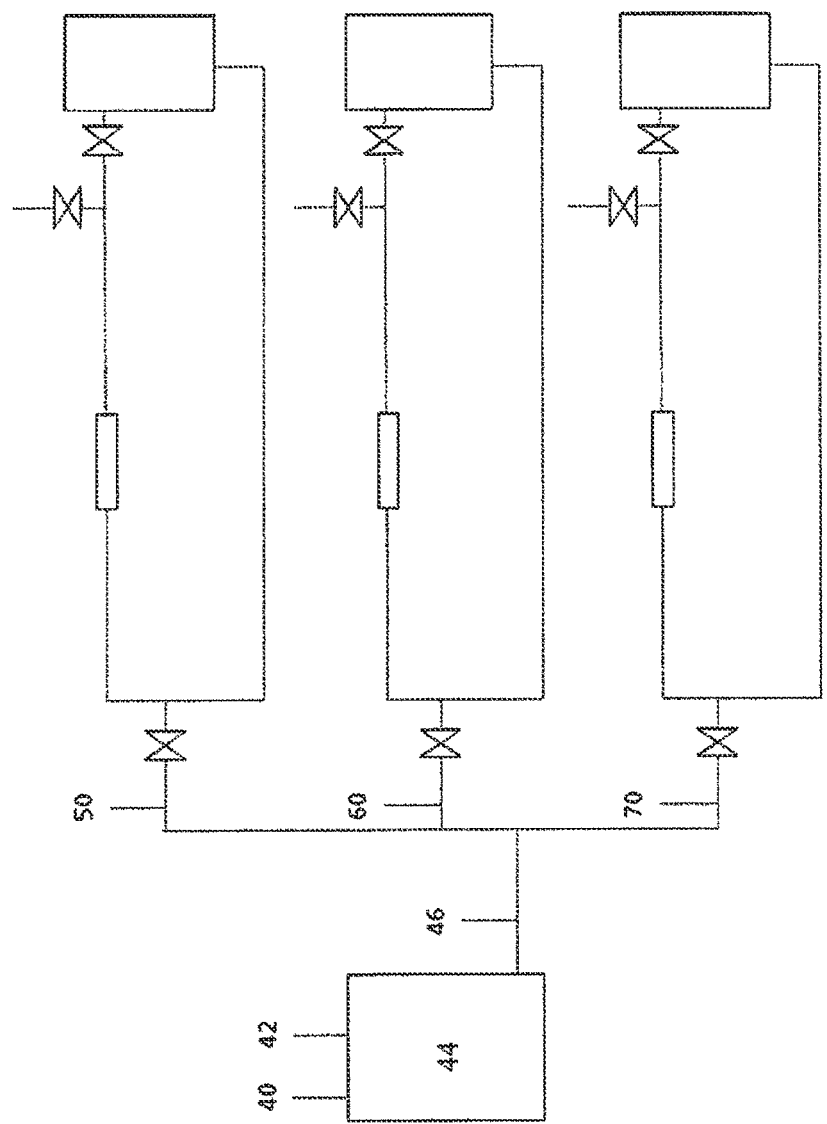

As shown in FIG. 3, one embodiment of the inventive multiple batch system comprises a dosing unit (44) connected to a water supply (40) and a storage container for solid material (42). Connected with the dosing unit (44), there is a mater batch line (50) and at least two slave batch lines (60), (70), wherein each of the lines are separated from the dosing unit (44) by a back-pressure valve. Furthermore, each of the lines is connected to the dosing unit (44) by a slurry supply (46). The master batch line (50) and the at least one slave batch line (60), (70) comprise in circular communication a gas dosing inlet such as venturi injector for introducing carbon dioxide into the suspension of calcium carbonate, at least one mixing unit and at least one tank, preferably equipped with a control unit monitoring and regulating the filling level of the tank. The master batch line (50) and the at least one slave batch line (60), (70) preferably further comprise a pump located at each of the gas dosing inlets such that the content of the master batch line (50) and the at least one slave batch line (60), (70) can be independently recirculated in the master batch line (50) and the at least one slave batch line (60), (70), respectively.

EXAMPLES

The following examples present different ways of preparing aqueous solutions of calcium hydrogen carbonate, known as calcium bicarbonate, using the multiple batch system comprising a master batch line and at least one slave batch line. The obtained solution of calcium hydrogen carbonate is then used for the remineralization of soft water, which could be for instance natural soft water from ground water or surface water sources, desalinated water from reverse osmosis or distillation, rain water. The trials using the multiple batch system were performed using different calcium carbonate products as raw material for the preparation of said solutions of calcium hydrogen carbonate.

All trials were performed under room temperature, i.e. at a temperature of from 15 to 25° C. It is to be noted that the RO (reverse osmosis) water provided at the beginning of each trial had a temperature of about room temperature, i.e. of from 15 to 25° C.

The following Table 1 summarizes the different calcium carbonate products used during the remineralization pilot trials using the multiple batch system.

TABLE 1

| Samples[1] | Calcium carbonate rock | $d_{50}$ [μm] | $CaCO_3$ [wt.-%] | HCl insoluble [wt.-%] |
|---|---|---|---|---|
| A | Limestone | 3.0 | 99.3 | 0.1 |
| B | Marble | 3.5 | 98.0 | 0.2 |

[1]All calcium carbonates used in the present invention are commercially available from Omya International AG, Switzerland.

The respective micronized calcium carbonate is poured in a funnel placed at the top of the dosing unit allowing a precise dosing of the powder into the dosing unit by means of a dosing screw connecting the bottom part of the funnel to the top of the dosing unit. The calcium carbonate suspension is prepared in the dosing unit by mixing the micronized calcium carbonate powder to RO (reverse osmosis) water. The RO water was produced on-site using a reverse osmosis unit, BWT PERMAQ Pico, provided by Christ and had the average quality as outlined in the following Table 2.

TABLE 2

| | pH | Alkalinity (mg/l as $CaCO_3$) | Conductivity (μS/cm) | Turbidity (NTU) |
|---|---|---|---|---|
| RO water | 5.4-5.6 | 5-10 | 10-20 | <0.1 |

The filling up of the dosing unit with RO water and the corresponding amount of micronized calcium carbonate is programmed and set according to the level switches placed inside the tank of the dosing unit. The initial solid content of the calcium carbonate suspension in the dosing unit varies within the range of 0.01-2 g/l as $CaCO_3$. The RO water is added by the means of a pump and introduced by a pipe connected to the top of the dosing unit, while the calcium carbonate powder is added to the dosing unit from the dosing screw placed at the top of the dosing unit. Both the RO water and the micronized calcium carbonate are dosed proportionally accordingly to a previously pre-programmed ratio allowing a constant solid content of the aqueous suspension of calcium carbonate in the dosing unit.

In the start-up procedure the dosing unit is filled up completely with the calcium carbonate suspension at a defined starting solid content. Then, the calcium carbonate suspension is pumped out of the dosing unit to feed one or more mixing units each having a volume of 100 l of the multiple batch system.

Impact of the $CO_2$ Stoichiometric Ratio

Different $CO_2$ stoichiometric ratios compared to the initial calcium carbonate solid content were tested using the inventive multiple batch system. The $CO_2$ stoichiometric ratios are the x-fold ratio of the $CaCO_3$ molar concentration of the aqueous starting slurry and varied from 2- to 6-fold, giving 24 to 72 l of $CO_2$ (injected at a pressure of 2 bars) dosed per batch line into the 100 l mixing unit of the multiple batch system. These tests were performed on the $CaCO_3$ sample A (limestone, $d_{50}$=3.0 μm) at an initial solid content in the $CaCO_3$ slurry of 500 mg/l by using the single batch mode with a time-controlled setting.

The following Table 3 shows the parameters measured for the resulting aqueous calcium hydrogen carbonate solutions obtained by using the single batch mode at different tested $CO_2$ stoichiometric ratios dosed with a constant $CO_2$ flow rate of 2.5 l/min (injected at a pressure of 2 bars) with time-controlled batches of 90 minutes.

TABLE 3

| Trials # | $CO_2$ stoichiometric ratio [x-fold] | Conductivity (μS/cm) | Turbidity (NTU) | pH |
|---|---|---|---|---|
| 1 | 2 | 605 | 220 | 6.5 |
| 2 | 3 | 645 | 120 | 6.2 |
| 3 | 5 | 710 | 83 | 6.1 |

The following Table 4 shows the parameters measured for the aqueous calcium hydrogen carbonate solutions obtained by using the single batch mode at different tested $CO_2$ stoichiometric ratios dosed with a constant $CO_2$ flow rate of 5 l/min (injected at a pressure of 2 bars) with time-controlled batches of 70 minutes.

TABLE 4

| Trials # | $CO_2$ stoichiometric ratio [x-fold] | Conductivity (μS/cm) | Turbidity (NTU) | pH |
|---|---|---|---|---|
| 4 | 3 | 685 | 155 | 6.2 |
| 5 | 4 | 740 | 100 | 6.0 |
| 6 | 5 | 800 | 50 | 6.0 |

These two sets of examples show that if the $CO_2$ stoichiometric ratio relative to the $CaCO_3$ initial solid content of the aqueous starting slurry is increased, the conductivity increases proportionally thereto, while the turbidity as well as the pH values decreases. Accordingly, it can be concluded that the more $CO_2$ is dosed into the corresponding batch line the more calcium carbonate is dissolved in the liquid phase of the calcium carbonate suspension and thus forming a solution of calcium hydrogen carbonate.

Impact of the $CO_2$ Dosing Rate

Different $CO_2$ dosing rates of a defined volume of $CO_2$ to be added to the initial calcium carbonate suspension were tested using the inventive multiple batch system. The $CO_2$ stoichiometric ratios are kept constant to a pre-defined value between 2- to 6-fold in respect to the $CaCO_3$ molar concentration of the aqueous starting suspension of calcium carbonate, giving 24 to 72 l of $CO_2$ (injected at a pressure of 2 bars) dosed per batch line into the 100 l mixing unit of the multiple batch system. The pre-defined volume of $CO_2$ was then dosed at different dosing rates into each batch line varying between 1 and 6.2 l/min (injected at a pressure of 2 bars), with 4 to 5 l/min of $CO_2$ usually being the upper limit for the pumps to work properly. The maximum $CO_2$ dosing rate also depends on the temperature at which the trials are performed, because the solubility of $CO_2$ into the aqueous phase is reversely proportional to the temperature. In general, lower temperature allows better dissolution of $CO_2$ and therefore allows in this case a higher $CO_2$ dosing rate. In this regard, trials performed on the multiple batch system showed that the maximum $CO_2$ dosing rate was 5 l/min (injected at a pressure of 2 bars) for trials run at 15° C. and a maximum of 4 l/min (injected at a pressure of 2 bars) for trials run at 20° C. All the below mentioned trials were performed by using the single batch mode and calcium carbonate sample A as outlined above (limestone, $d_{50}$=3.0 μm) at an initial solid content in the calcium carbonate suspension of 500 mg/l with a time-controlled setting.

The following Table 5 shows the parameters measured for the resulting aqueous solution of calcium hydrogen carbonate obtained by using the single batch mode at different tested $CO_2$ dosing rates for a constant 5-fold $CO_2$ stoichiometric ratio (corresponding to an added volume of $CO_2$ of 60 l, injected at a pressure of 2 bars) with time-controlled batches of 70-90 minutes.

TABLE 5

| Trials # | CO$_2$ dosing rate [l/min] | Conductivity (μS/cm) | Turbidity (NTU) | pH |
|---|---|---|---|---|
| 7 | 1 | 690 | 100 | 6.1 |
| 3 | 2.5 | 710 | 83 | 6.1 |
| 8 | 4 | 785 | 85 | 5.9 |
| 6 | 5 | 800 | 50 | 6.0 |

From Table 5, it can be gathered that if the CO$_2$ dosing rate increases the conductivity increases proportionally, while the turbidity as well as the pH values decrease. Thus, it can be concluded that the more CO$_2$ is dosed at once in the corresponding batch line, the more calcium carbonate is dissolved in the liquid phase of the calcium carbonate suspension and thus forming a solution of calcium hydrogen carbonate. This trend has generally been observed in the other performed trials.

Impact of Starting Solid Content of the CaCO$_3$ Aqueous Slurry

The initial solid content of the aqueous calcium carbonate suspension has been studied through various trials using the multiple batch system in order to produce a highly concentrated solution of calcium hydrogen carbonate with a minimum of CO$_2$ excess, and in the meanwhile trying to achieve turbidity levels as low as possible. The following trials were performed using the CaCO$_3$ sample A as outlined above (limestone, $d_{50}$=3.0 μm) at an initial solid content in the calcium carbonate suspension of 500 mg/l, 700 mg/l and 1,000 mg/l with corresponding CO$_2$ stoichiometric ratio varying between 3 and 6-fold the molar concentration of the calcium carbonate present in the starting calcium carbonate suspension. The trials were performed by using the single batch mode with time-controlled batches of between 30 and 90 minutes.

The following Table 6 shows the parameters measured for the resulting aqueous solution of calcium hydrogen carbonate obtained by using the single batch mode at constant CO$_2$ dosing rate of 4 l/min (injected at a pressure of 2 bars) for different starting solid contents of the calcium carbonate suspension and its corresponding CO$_2$ stoichiometric ratios.

TABLE 6

| Trials # | Initial slurry solid content [mg/l] | CO$_2$ stoichiometric ratio [x-fold] | Conductivity (μS/cm) | Turbidity (NTU) | pH | Time-controlled setting (min) |
|---|---|---|---|---|---|---|
| 9 | 500 | 5 | 704 | 38 | 5.9 | 60 |
| 8 | 500 | 5 | 785 | 85 | 5.9 | 70 |
| 10 | 500 | 6 | 800 | 30 | 5.9 | 90 |
| 11 | 700 | 3.6 | 860 | 147 | 6.1 | 60 |
| 12 | 700 | 4.3 | 887 | 330 | 6 | 30 |
| 13 | 700 | 4.3 | 972 | 120 | 6 | 90 |
| 14 | 1,000 | 3 | 1,050 | 670 | 6.2 | 30 |
| 15 | 1,000 | 3 | 900 | 790 | 6.1 | 30 |
| 16 | 1,000 | 3 | 1,100 | 445 | 6.1 | 80 |

From Table 6, it can be gathered that increasing the initial solid content of the calcium carbonate solid content leads to a higher conductivity measured for the resulting solution of calcium hydrogen carbonate; even with a proportionally lower CO$_2$ stoichiometric ratio. However, it should be noted that a good portion of the calcium carbonate is not dissolved in the aqueous phase of the calcium carbonate suspension and, thus, remains as a suspension of calcium carbonate inducing a turbidity increase. When trials are performed at high starting solid content in the calcium carbonate suspension, for instance 1,000 mg/l CaCO$_3$, turbidity can reach values above 400 NTU.

In addition thereto, the corresponding batch time shows a significant impact on the characteristics of the final solution of calcium hydrogen carbonate. In general, if the batch times are longer, a decrease of turbidity and an increase of conductivity are observed.

In order to decrease or remove turbidity from the solution of calcium hydrogen carbonate obtained during trials #13 and #16, the solutions were filtered by using an ultrafiltration membrane. The resulting filtered solutions of calcium hydrogen carbonate had turbidity levels below the detection limit, i.e. <0.1 NTU, for conductivity up to 950 and 1,050 μS/cm for trials #12 ([CaCO$_3$]$_{slurry}$=700 mg/l) and for trials #15 ([CaCO$_3$]$_{slurry}$=1,000 mg/l) respectively.

Impact of the Starting CaCO$_3$ Product

The following pilot trials were performed using two calcium carbonate samples of different geological sources, being a limestone containing 99.3 wt.-% calcium carbonate, based on the total weight of the calcium carbonate sample, and with a mean particle size $d_{50}$=3.0 μm (sample A), and a marble containing 98 wt.-% calcium carbonate, based on the total weight of the calcium carbonate sample, and with a mean particle size $d_{50}$=3.5 μm (sample B). Both calcium carbonate samples were tested by using the single batch mode and with CO$_2$ dosing at 4 l/min, for an initial solid content of the aqueous CaCO$_3$ slurry of 500 mg/l and 700 mg/l, with 5-fold or 3.6-fold CO$_2$ stoichiometric ratios, respectively.

The following Table 7 shows the parameters measured for the resulting aqueous solution of calcium hydrogen carbonate obtained in the single batch mode at constant CO$_2$ dosing rate of 4 l/min (injected at a pressure of 2 bars) during 15 minutes for different calcium carbonate samples at two different solid contents of the calcium carbonate suspension and its corresponding CO$_2$ stoichiometric ratios.

TABLE 7

| Trials # | CaCO$_3$ source | Initial slurry solid content [mg/l] | Conductivity (μS/cm) | Turbidity (NTU) | pH | Time-controlled setting (min) |
|---|---|---|---|---|---|---|
| 9 | Sample A | 500 | 704 | 38 | 5.9 | 60 |
| 17 | Sample B | 500 | 735 | 30 | 6.0 | 60 |
| 11 | Sample A | 700 | 860 | 147 | 6.1 | 60 |
| 18 | Sample B | 700 | 911 | 80 | 6.0 | 65 |

From Table 7, it can be gathered that trials #17 and #18, using the marble geological source (sample B), presented higher conductivity and lower turbidity of the resulting solution of calcium hydrogen carbonate than the obtained solutions from limestone geological source (sample A) as used in trials #9 and #11.

Impact of the Value Controlled Batches

The multiple batch system allows the preparation of the solution of calcium hydrogen carbonate controlled by the monitored parameters of the master batch line, such as pH, turbidity or conductivity. When the set value is reached, for instance, the target conductivity being 1,000 μS/cm, the corresponding batch is completed and the obtained solution of calcium hydrogen carbonate is then discharged. The batch time to reach this target value within the master batch line is then implemented to the at least one slave batch line, and the solution of calcium hydrogen carbonate obtained for any slave batch line is also discharged after this defined batch time has been reached. The batch time of the master batch line to reach the set value is then updated for each single run.

Various trials have been performed in value-controlled mode with either conductivity or turbidity values, or both conductivity and turbidity values. The following trials were performed using the calcium carbonate sample A (limestone, $d_{50}$=3.0 µm) at different initial solid content in the calcium carbonate suspension with defined $CO_2$ stoichiometric ratio (injected at a pressure of 2 bars).

The following Table 8 shows the parameters measured for the resulting aqueous solution of calcium hydrogen carbonate obtained by using the single batch mode under different value controlled settings. It is appreciated that the corresponding values set out in the column "value controlled" must be reached before the resulting aqueous solution of calcium hydrogen carbonate is released from the system.

TABLE 8

| Trials # | Initial slurry solid content [mg/l] | Process setting: $CO_2$ ratio, $CO_2$ dosing rate | Value controlled | Conductivity (µS/cm) | Turbidity (NTU) | Process batch time (min) |
|---|---|---|---|---|---|---|
| 20 | 500 | 6-fold, 3 l/min | <150 NTU | 860 | 150 | 26 |
| 21 | 500 | 7.5-fold, 3 l/min | <150 NTU | 800 | 150 | 20 |
| 22 | 1000 | 3-fold, 4 l/min | >1,000 µS/cm, <700 NTU | 1,303 | 700 | 44 |
| 23 | 1000 | 3-fold, 4 l/min | >1,000 µS/cm, <800 NTU | 1,200 | 800 | 28 |
| 24 | 1000 | 3-fold, 4 l/min | >1,000 µS/cm, <800 NTU | 1,210 | 800 | 31 |
| 25 | 1200 | 3.3-fold, 3 l/min | >1,000 µS/cm | 1,000 | 442 | 26 |
| 26 | 1800 | 2.2-fold, 3 l/min | <800 NTU | 1,450 | 800 | 65 |
| 27 | >2000 | 2-fold, 3 l/min | >1,000 µS/cm | 1,720 | 2,970 | N/A |

From Table 8, it can be gathered that the calcium carbonate suspension having an initial solid content of 500 mg/l reached a turbidity of lower than 150 NTU within 20 or 26 minutes according to the $CO_2$ stoichiometric ratio used, i.e. 7.5-fold or 6-fold respectively. Higher solid contents of the calcium carbonate slurry were tested with values controlled for turbidity lower than 700 or 800 NTU. Calcium carbonate slurries having initial solids contents of more than 1,000 mg/l may be further treated afterwards by using filtration means, such as ultrafiltration or microfiltration.

Impact of the Number of Static Mixers

Further testing using the multiple batch system has been performed implementing only one static mixer instead of the two static mixers in series used for all the previous trials for the preparation of the solution of calcium hydrogen carbonate. The following trials were performed using the calcium carbonate sample A (limestone, $d_{50}$=3.0 µm) at an initial solid content of 500 mg/l in the calcium carbonate suspension and a 6-fold $CO_2$ stoichiometric ratio dosed at 4 l/min (injected at a pressure of 2 bars).

The following Table 9 shows the parameters measured for the resulting aqueous solution of calcium hydrogen carbonate by using constant process settings and the single batch mode. Furthermore, the master batch line was equipped with one static mixer.

TABLE 9

| Trial # | Number of static mixers | Conductivity (µS/cm) | Turbidity (NTU) | pH | Time-controlled setting (min) |
|---|---|---|---|---|---|
| 28 | 1 | 1,022 | 88 | 6.1 | 60 |

From Table 9, it can be seen that high conductivity can also be achieved while using only one static mixer meaning that the solution of calcium hydrogen carbonate was formed. The obtained pH value also fits with the expected values.

Impact of a Closed Tank

The following pilot trials were performed on a multiple batch system comprising a closed tank. The closed tank has a pressure-released valve at I bar. The calcium carbonate sample used for these trials were samples A (limestone, $d_{50}$=3.0 µm) and B (marble, $d_{50}$=3.5 µm) at an initial solid content of the aqueous $CaCO_3$ slurry of 500 mg/l of $CaCO_3$. The $CO_2$ dosing was performed at 4 l/min (injected at a pressure of 2 bars) for testing with a 5-fold $CO_2$ stoichiometric ratio and dosed using only one static mixer. It is to be noted that the trials with the closed tank were performed under room temperature, i.e. of around 25° C., while the trials performed with the open tank were performed at a temperature of around 15° C.

The following Table 10 shows the parameters measured for the resulting aqueous solution of calcium hydrogen carbonate obtained in the single batch mode at constant $CO_2$ dosing rate of 4 l/min (injected at a pressure of 2 bars) during 15 minutes for different calcium carbonate samples at initial solid contents of the calcium carbonate suspension of 500 mg/l and its corresponding $CO_2$ stoichiometric ratios.

TABLE 10

| Trials # | Sample | Vessel | Time-controlled setting (min) | Conductivity (µS/cm) | Turbidity (NTU) | pH |
|---|---|---|---|---|---|---|
| 9 | A | open | 60 | 704 | 38 | 5.9 |
| 29 | A | closed | 30 | 485 | 22 | 5.6 |
| 30 | A | closed | 60 | 660 | 22 | 5.8 |
| 31 | A | closed | 50 | 665 | 55 | 5.9 |
| 9 | B | open | 60 | 735 | 30 | 6.0 |
| 32 | B | closed | 40 | 720 | 21 | 5.8 |
| 33 | B | closed | 55 | 615 | 12 | 5.9 |

From Table 10, it can be gathered that both open and closed systems reach the expected values for conductivity, pH and turbidity.

Impact of the Consecutive Runs

The multiple batch system allows consecutive runs to be done in every individual batch of the multiple batch system, i.e. in the master batch line and each slave batch line, with specifically selected process settings. During this continuous mode each run of the master batch line is monitored and the process parameters such as conductivity, turbidity, pH and temperature are recorded.

The following Table 11 shows the parameters measured for the resulting aqueous solution of calcium hydrogen carbonate obtained by using the continuous batch mode under different process conditions. The $CO_2$ was injected at a pressure of 2 bars.

The filling up of the dosing unit with RO water and the corresponding amount of micronized calcium carbonate runs automatically according to the defined settings. The solid content of the calcium carbonate suspension in the dosing unit (44) was 400 mg/L of $CaCO_3$.

TABLE 11

| Trials # | $CaCO_3$ source | Initial slurry solid content [mg/l] | Process setting: $CO_2$ ratio, $CO_2$ dosing rate | Value controlled | Number of runs | Conductivity (μS/cm) | Turbidity (NTU) |
|---|---|---|---|---|---|---|---|
| 9 | Sample A | 500 | 5-fold, 4 l/min | 55 min | Run 1 | 704 | 38 |
|  |  |  |  |  | Runs 2-5 | 722 ± 22 | 29 ± 2 |
| 20 | Sample A | 500 | 6-fold, 3 l/min | 150 NTU | Run 1 | 730 | 150 |
|  |  |  |  |  | Runs 2-6 | 860 ± 35 |  |
| 28 | Sample A | 500 | 6-fold, 4 l/min | 60 min | Run 1 | 1022 | 88 |
|  |  |  |  |  | Runs 2-4 | 1,099 ± 13 | 53 ± 2 |
| 17 | Sample B | 500 | 5-fold, 4 l/min | 55 min | Run 1 | 735 | 30 |
|  |  |  |  |  | Runs 2-6 | 849 ± 33 | 34 ± 7 |
| 11 | Sample A | 700 | 3.6-fold, 4 l/min | 50 min | Run 1 | 860 | 147 |
|  |  |  |  |  | Runs 2-4 | 919 ± 7 | 156 ± 11 |
| 12 | Sample A | 700 | 4.3-fold, 4 l/min | 30 min | Run 1 | 887 | 334 |
|  |  |  |  |  | Runs 2-4 | 935 ± 13 | 224 ± 13 |
| 18 | Sample B | 700 | 5-fold, 4 l/min | 60 min | Run 1 | 911 | 80 |
|  |  |  |  |  | Runs 2-6 | 979 ± 18 | 80 ± 27 |
| 15 | Sample A | 1,000 | 3-fold, 4 l/min | 30 min | Run 1 | 900 | 790 |
|  |  |  |  |  | Runs 2-3 | 1,025 ± 35 | 725 ± 21 |
| 14 | Sample A | 1,000 | 3-fold, 4 l/min | 30 min | Run 1 | 1050 | 670 |
|  |  |  |  |  | Runs 2-4 | 1,208 ± 12 | 794 ± 84 |

From Table 11, it can be gathered that the first run leads to lower conductivity levels than the following runs, however no specific trend could be observed for turbidity between the first run and the following runs.

Pilot Unit Examples

The following examples present the way of preparing aqueous solutions of calcium hydrogen carbonate, known as calcium bicarbonate, using the inventive system for continuous pilot-scale trials. The obtained solution of calcium hydrogen carbonate is then used for the remineralization of soft water, which could be for instance natural soft water from ground water or surface water sources, desalinated water from reverse osmosis or distillation, or rain water. The trials using the inventive system were performed using one calcium carbonate product as raw material, namely Sample A listed in Table 1 above, for the preparation of a calcium carbonate suspension, hereafter slurry, and the resulting solution of calcium hydrogen carbonate obtained after the dosing of carbon dioxide.

The respective micronized calcium carbonate powder is poured from the storage container for solid material (42) into the dosing unit (44) by means of a dosing screw that allows a precise dosing of the powder into the dosing unit (44). The RO (reverse osmosis) water from the water supply (40) is added to the dosing unit (44) to which the micronized calcium carbonate is dosed to prepare a calcium carbonate suspension by mixing. The RO water was produced on-site using a reverse osmosis unit and had the average quality as outlined in the following Table 12.

TABLE 12

|  | pH | Conductivity (μS/cm) | Turbidity (NTU) |
|---|---|---|---|
| RO water | 6.4-6.6 | 10-25 | <0.1 |

The calcium carbonate suspension was first prepared in the dosing unit (44) and then the resulting 800 L of suspension were injected into the mater batch line (50) through the slurry supply (2 of FIG. 1 or 46 of FIG. 3). The master batch line comprises a gas dosing inlet (4), where carbon dioxide can be introduced into the aqueous suspension of calcium carbonate. The dissolution of calcium carbonate out of the aqueous suspension of calcium carbonate occurs in the presence of carbon dioxide to form the solution of concentrated calcium hydrogen carbonate within the master batch line (50). The $CO_2$ dosage consisted in dosing 1.05 g/L $CO_2$ into the calcium carbonate suspension, representing a stoichiometric excess of 6-fold of $CO_2$ in comparison to the calcium carbonate present in the suspension. The batch time for these pilot trials were set to 100 minutes in order to follow the dissolution of calcium carbonate by this process.

Table 13 summarizes the process settings for this 11-day pilot trial.

TABLE 13

| Concentrate batch volume (L) | Target concentration (mg/L as $CaCO_3$) | $CO_2$ dosage (g/L) | Target $CO_2$/$CaCO_3$ stoichiometric ratio (x-fold) | Recirculation batch time (min) |
|---|---|---|---|---|
| 800 | 400 | 1 | 6 | 100 |

Samples of the resulting solution of concentrated calcium hydrogen carbonate were taken at 0, 30, 60 and 100 minutes in respect to the batch time, and parameters such as pH, conductivity, turbidity were analysed. On the final concentrated calcium hydrogen carbonate, sampled at 100 minutes both the alkalinity and the acidity were measured in addition to the other measured parameters.

Table 14 summarizes the average manually measured parameters of the obtained concentrated calcium hydrogen carbonate according to the process settings set for the long-run pilot trial.

TABLE 14

| Samples | Average manually measured values | | |
|---|---|---|---|
| Batch time (min) | Conductivity (µS/cm) | pH | Turbidity (NTU) |
| 0 | 177 | 7.6 | 600 |
| 30 | 647 | 6.2 | 57 |
| 60 | 698 | 6.2 | 20 |

Table 15 summarizes the average manually measured parameters of the obtained concentrated calcium hydrogen carbonate according to the process settings set for the long-run pilot trial.

TABLE 15

| Samples | | Average manually measured values | | | | |
|---|---|---|---|---|---|---|
| Batch time (min) | Temperature (° C.) | Conductivity (µS/cm) | pH | Turbidity (NTU) | Alkalinity (mg/L as $CaCO_3$) | Acidity (mg/L as $CO_2$) |
| 100 | 16.5 | 719 | 6.4 | 8.2 | 420 | 45 |

The invention claimed is:

1. A multiple batch system for the preparation of a solution of calcium hydrogen carbonate, the multiple batch system comprising:
   a) at least one dosing unit for dosing a suspension of calcium carbonate into the master batch line and the at least one slave batch line,
   b) a master batch line comprising in circular communication:
      (i) at least one gas dosing inlet for dosing carbon dioxide gas,
      (ii) at least one mixing unit provided with at least one inlet and at least one outlet, and
      (iii) at least one tank provided with at least one inlet and at least one outlet,
   c) at least one slave batch line comprising in circular communication:
      (i) at least one gas dosing inlet for dosing carbon dioxide gas,
      (ii) at least one mixing unit provided with at least one inlet and at least one outlet, and
      (iii) at least one tank provided with at least one inlet and at least one outlet,
   d) a control unit for measuring one or more of pH, turbidity, conductivity, temperature and calcium ion concentration of the calcium carbonate suspension and/or the solution of calcium hydrogen carbonate, and
   e) a storage tank comprising carbon dioxide in gaseous or liquid form,
   wherein the master batch line and the at least one slave batch line are independently connected to the at least one dosing unit, and
   wherein the master batch line is in a separate loop from the at least one slave batch line.

2. The multiple batch system according to claim 1, wherein the at least one dosing unit is connected to a water reservoir and a storage container for solid material.

3. The multiple batch system according to claim 1, wherein the at least one gas dosing inlet of the master batch line and/or the at least one slave batch line is located before the at least one mixing unit.

4. The multiple batch system according to claim 1, wherein the master batch line and/or the at least one slave batch line comprises one mixing unit.

5. The multiple batch system according to claim 1, wherein the master batch line and/or the at least one slave batch line comprises at least two mixing units.

6. The multiple batch system according to claim 1, wherein the master batch line and/or the at least one slave batch line comprises at least two mixing units connected in series.

7. The multiple batch system according to claim 1, wherein the at least one mixing unit of the master batch line and/or the at least one slave batch line is a vertical and/or horizontal mixing unit.

8. The multiple batch system according to claim 1, wherein the at least one mixing unit of the master batch line and/or the at least one slave batch line is a vertical mixing unit.

9. The multiple batch system according to claim 1, wherein the at least one mixing unit of the master batch line and/or the at least one slave batch line is at least one static mixer.

10. The multiple batch system according to claim 1, wherein the at least one mixing unit of the master batch line and/or the at least one slave batch line is located between the at least one gas dosing inlet and the at least one tank.

11. The multiple batch system according to claim 1, wherein the at least one mixing unit of the master batch line and/or the at least one slave batch line is at least one dynamic mixer.

12. The multiple batch system according to claim 11, wherein the at least one mixing unit of the master batch line and/or the at least one slave batch line is located between the at least one gas dosing inlet and the at least one tank or integrated in the at least one tank.

13. The multiple batch system according to claim 1, wherein the master batch line comprises at least one control unit monitoring at least one of pH, turbidity, conductivity, temperature and calcium ion concentration.

14. The multiple batch system according to claim 1, wherein the master batch line comprises at least one control unit monitoring a calcium ion concentration by an ion sensitive electrode.

15. The multiple batch system according to claim 1, further comprising at least one membrane filtration unit.

16. The multiple batch system according to claim 1, further comprising a cross flow or dead-end membrane microfiltration device and/or a cross flow or dead-end membrane ultrafiltration device.

* * * * *